US009007639B2

(12) United States Patent
Fukuda

(10) Patent No.: US 9,007,639 B2
(45) Date of Patent: Apr. 14, 2015

(54) INFORMATION PROVIDING DEVICE, INFORMATION PROVIDING METHOD, AND INFORMATION PROVIDING SYSTEM THAT SPECIFY A REGION WHERE AN INFORMATION PROCESSING TERMINAL IS AND SPECIFY ONE OR MORE INFORMATION PROCESSING APPARATUSES WHICH ARE IN THE REGION

(71) Applicant: Michitaka Fukuda, Kanagawa (JP)

(72) Inventor: Michitaka Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/023,946

(22) Filed: Sep. 11, 2013

(65) Prior Publication Data

US 2014/0071488 A1 Mar. 13, 2014

(30) Foreign Application Priority Data

Sep. 13, 2012 (JP) ................................. 2012-202095
Sep. 3, 2013 (JP) ................................. 2013-182177

(51) Int. Cl.
*G06F 3/12* (2006.01)

(52) U.S. Cl.
CPC ............ *G06F 3/1201* (2013.01); *G06F 3/1204* (2013.01); *G06F 3/1228* (2013.01); *G06F 3/1247* (2013.01); *G06F 3/126* (2013.01); *G06F 3/1292* (2013.01)

(58) Field of Classification Search
None
See application file for complete search history.

(56) References Cited

U.S. PATENT DOCUMENTS

| | | | | |
|---|---|---|---|---|
| 6,665,712 | B2 * | 12/2003 | Pickup | 709/219 |
| 8,208,932 | B2 * | 6/2012 | Sayers et al. | 455/445 |
| 8,249,914 | B2 | 8/2012 | Umeda | |
| 8,280,398 | B2 | 10/2012 | Ishii et al. | |
| 8,493,605 | B2 * | 7/2013 | Wada | 358/1.15 |
| 2004/0137855 | A1 * | 7/2004 | Wiley et al. | 455/88 |

FOREIGN PATENT DOCUMENTS

| | | |
|---|---|---|
| JP | 2005-158007 | 6/2005 |
| JP | 2009-225287 | 10/2009 |
| WO | WO2005/086375 | 9/2005 |

OTHER PUBLICATIONS

U.S. Appl. No. 13/795,383, filed Mar. 12, 2013.
U.S. Appl. No. 13/784,961, filed Mar. 5, 2013.

* cited by examiner

*Primary Examiner* — Paul F Payer
(74) *Attorney, Agent, or Firm* — Oblon, McClelland, Maier & Neustadt, L.L.P.

(57) ABSTRACT

An information providing device, which is capable of communicating with an information processing terminal and one or more information processing apparatuses executing processing responding to a request from the information processing terminal, including a position data obtaining unit configured to obtain position data of the information processing terminal and the information processing apparatuses; a specifying unit configured to specify, based on the obtained position data of the information processing terminal, a region where the information processing terminal is, and specify, based on the obtained position data of the information processing apparatuses, one or more of the information processing apparatuses which are in the region; and an instruction unit configured to, responding to the request from the information processing terminal, instruct an information processing apparatus of the specified information processing apparatuses specified by the specifying unit and specified by the request to execute the processing also specified by the request.

11 Claims, 24 Drawing Sheets

| BROADCASTING DEVICE ID | LATITUDE | LONGITUDE | FLOOR | BUILDING | |
|---|---|---|---|---|---|
| C1 | 35.459400 | 139.387100 | 16 | C | 160 |
| C2 | 35.459400 | 139.387150 | 16 | C | 162 |
| C3 | 35.459450 | 139.387100 | 16 | C | 164 |
| C4 | 35.459450 | 139.387150 | 16 | C | 166 |
| : | : | : | : | : | |

FIG.13A

| LATITUDE | LONGITUDE | FLOOR | BUILDING | RECEIPT DATA AND TIME |
|---|---|---|---|---|
| : | : | : | : | : |
| 35.459400 | 139.387100 | 16 | C | 4/5/2012 15:00:00 |

[ 012345abcd01 ] 120

FIG.13B

| LATITUDE | LONGITUDE | FLOOR | BUILDING | RECEIPT DATA AND TIME |
|---|---|---|---|---|
| : | : | : | : | : |
| 35.459400 | 139.387150 | 16 | C | 4/1/2012 01:10:00 |

[ 002673abcd01 ] 140

FIG.13C

| LATITUDE | LONGITUDE | FLOOR | BUILDING | RECEIPT DATA AND TIME |
|---|---|---|---|---|
| : | : | : | : | : |
| 35.459450 | 139.387100 | 16 | C | 4/5/2012 13:01:05 |

[ 003700abcd02 ] 142

FIG.13D

| LATITUDE | LONGITUDE | FLOOR | BUILDING | RECEIPT DATA AND TIME |
|---|---|---|---|---|
| : | : | : | : | : |
| 35.459450 | 139.387150 | 16 | C | 4/3/2012 05:50:25 |

[ 002000abcd03 ] 144

FIG.14

| NUMBER | APPARATUS NAME | IDENTIFICATION DATA | FUNCTION NAME | SUPPORTED FORMAT | |
|---|---|---|---|---|---|
| 1 | PRT1000 | 002673abcd01 | PRINTING | jpg | 140 |
| 2 | PRJ2000 | 003700abcd02 | DISPLAY | doc, ppt, mpg | 142 |
| 3 | MFP3000 | 002000abcd03 | PRINTING / STORAGE | doc, pdf, jpg, gif | 144 |
| : | : | : | : | : | |

FIG.15

| REGION NAME | EAST END | WEST END | SOUTH END | NORTH END | FLOOR | BUILDING |
|---|---|---|---|---|---|---|
| C16-Sサイド | 139.387500 | 139.387000 | 35.459200 | 35.459500 | 16 | C |
| C16-Nサイド | 139.387500 | 139.387000 | 35.459500 | 35.459800 | 16 | C |
| C16-Sサイド | 139.387500 | 139.387000 | 35.459200 | 35.459500 | 16 | C |
| : | : | : | : | : | : | : |

FIG.16

| IDENTIFICATION DATA | LATITUDE | LONGITUDE | FLOOR | BUILDING | RECEIPT DATA AND TIME | APPARATUS NAME | FUNCTION NAME | SUPPORTED FORMAT |
|---|---|---|---|---|---|---|---|---|
| 002673abcd01 | 35.459400 | 139.387150 | 16 | C | 4/1/2012 01:10:00 | PRT1000 | PRINTING | jpg |
| 003700abcd02 | 35.459450 | 139.387100 | 16 | C | 4/5/2012 13:01:05 | PRJ2000 | DISPLAY | doc, ppt, mpg |
| 002000abcd03 | 35.459450 | 139.387150 | 16 | C | 4/3/2012 05:50:25 | MFP3000 | PRINTING / STORAGE | doc, pdf, jpg, gif |
| : | : | : | : | : | : | : | : | : |

1600 (LATITUDE through RECEIPT DATA AND TIME)

1610 (APPARATUS NAME through SUPPORTED FORMAT)

FIG.19

| FLOOR 9bit | LATITUDE 21bit | LONGITUDE 21bit | BUILDING NUMBER 8bit |
|---|---|---|---|

FIG.20

| LATITUDE | LONGITUDE | FLOOR | BUILDING |
|---|---|---|---|
| 35.459400 | 139.387100 | 16 | C |

FIG.21

| IDENTIFICATION DATA | LATITUDE | LONGITUDE | FLOOR | BUILDING |
|---|---|---|---|---|
| 002673abcd01 | 35.459400 | 139.387100 | 16 | C |

FIG.22

| INPUT FILE INFORMATION | IDENTIFICATION DATA OF PROCESSING APPARATUS | PROCESSING INFORMATION |
|---|---|---|
| 192.168.1.10/user1/doc/picture.jp2 | 002000abcd03 | PRINTING |

INFORMATION PROVIDING DEVICE, INFORMATION PROVIDING METHOD, AND INFORMATION PROVIDING SYSTEM THAT SPECIFY A REGION WHERE AN INFORMATION PROCESSING TERMINAL IS AND SPECIFY ONE OR MORE INFORMATION PROCESSING APPARATUSES WHICH ARE IN THE REGION

BACKGROUND OF THE INVENTION

1. Field of the Invention

An aspect of this disclosure is related to an information providing device, an information providing method, and an information providing system.

2. Description of the Related Art

An information processing terminal such as a laptop PC or a smartphone, which a user may carry easily, is commonly used. In addition, many services are provided for access to fast and broadband networks. Through such networks, the information processing terminal may be connected to devices installed on various locations.

A user who carries the information processing terminal to work, when he visits a certain office for first time, has to configure the information processing terminal in order to use devices (e.g. printers) installed in the office individually.

Patent Document 1 discloses a technology to configure the information processing terminal with a network address obtained via a configuration network from a printer. However, when it is the first time for the information processing terminal to be connected with the printer, the user has to install a driver for the printer on the information processing terminal.

In addition, the information processing terminal may connect with not only the printer but any other devices. It is a bothersome operation for the user to install the driver or configure the information processing terminal every time the user visits an unknown place and uses an unknown device. Such an operation may become more bothersome for the user who moves frequently.

An aspect of this disclosure aims to allow a user to easily use devices near the user.

SUMMARY OF THE INVENTION

In an embodiment of this invention, there is provided an information providing device, which is capable of communicating with an information processing terminal and one or more information processing apparatuses executing processing responding to a request from the information processing terminal, that includes a position data obtaining unit configured to obtain position data of the information processing terminal and the information processing apparatuses;

a specifying unit configured to specify, based on the obtained position data of the information processing terminal, a region where the information processing terminal is, and specify, based on the obtained position data of the information processing apparatuses, one or more of the information processing apparatuses which are in the region; and an instruction unit configured to, responding to the request from the information processing terminal, instruct an information processing apparatus of the specified information processing apparatuses specified by the specifying unit and specified by the request to execute the processing also specified by the request.

According to another embodiment of this invention, there is provided an information providing method executed on an information providing device, which is capable of communicating with an information processing terminal and one or more information processing apparatuses executing processing responding to a request from the information processing terminal, the method including obtaining position data of the information processing terminal and the information processing apparatus;

specifying, based on the obtained position data of the information processing terminal, a region where the information processing terminal is;

specifying, based on the obtained position data of the information processing apparatuses, one or more of the information processing apparatuses which are in the region; and responding to the request from the information processing terminal, instructing an information processing apparatus of the information processing apparatuses specified at the specifying step and specified by the request to execute the processing also specified by the request.

According to another embodiment of this invention, there is provided an information providing system that includes an information processing terminal; and an information providing device which is capable of communicating with one or more information processing apparatuses executing processing responding to a request from the information processing terminal.

The information providing device includes a position data obtaining unit configured to obtain position data of the information processing terminal and the information processing apparatus;

a specifying unit configured to specify, based on the obtained position data of the information processing terminal, a region where the information processing terminal is, and specify, based on the obtained position data of the information processing apparatuses, one or more of the information processing apparatuses which are in the region;

a data transmission unit configured to transmit to the information processing terminal information about the information processing apparatuses specified by the specifying unit; and an instruction unit configured to, responding to the request from the information processing terminal, instruct an information processing apparatus of the information processing apparatuses specified by the specifying unit and specified by the request to execute the processing also specified by the request.

In addition, the information processing terminal includes an information display unit configured to display the information about the information processing apparatuses transmitted by the data transmission unit;

an operation accepting unit configured to accept an operation to choose the processing to be executed by the information processing apparatus of the displayed information processing apparatuses; and a processing request unit configured to transmit to the information providing device the request for allowing the chosen information processing apparatus to execute the processing chosen by the operation.

According to an embodiment of this invention, users are allowed to easily use devices near the users.

BRIEF DESCRIPTION OF THE DRAWINGS

Other objects and further features of embodiments may become apparent from the following detailed description when read in conjunction with the accompanying drawings, in which:

FIG. 12 is a table for storing data of broadcasting devices according to an embodiment of this invention;

FIG. 13A is a table storing position data of an information processing terminal according to an embodiment of this invention;

FIG. 13B is a table storing position data of an apparatus;

FIG. 13C is a table storing position data of an apparatus;

FIG. 13D is a table storing position data of an apparatus;

FIG. 14 is a table storing apparatus data of an apparatus;

FIG. 15 is a table storing region data of an apparatus;

FIG. 16 is a drawing illustrating data transmitted by an information providing device according to an embodiment of this invention;

FIG. 19 is a drawing illustrating position data included in a positioning signal;

FIG. 20 is a drawing illustrating position data broadcast by a broadcasting device according to an embodiment of this invention;

FIG. 21 is a drawing illustrating identification data and position data transmitted by an information processing terminal or an apparatus according to an embodiment of this invention;

FIG. 22 is a drawing illustrating data conveyed from an operation accepting unit to a process request transmission unit of an information processing terminal according to an embodiment of this invention;

DESCRIPTION OF THE PREFERRED EMBODIMENTS

Figure 1:
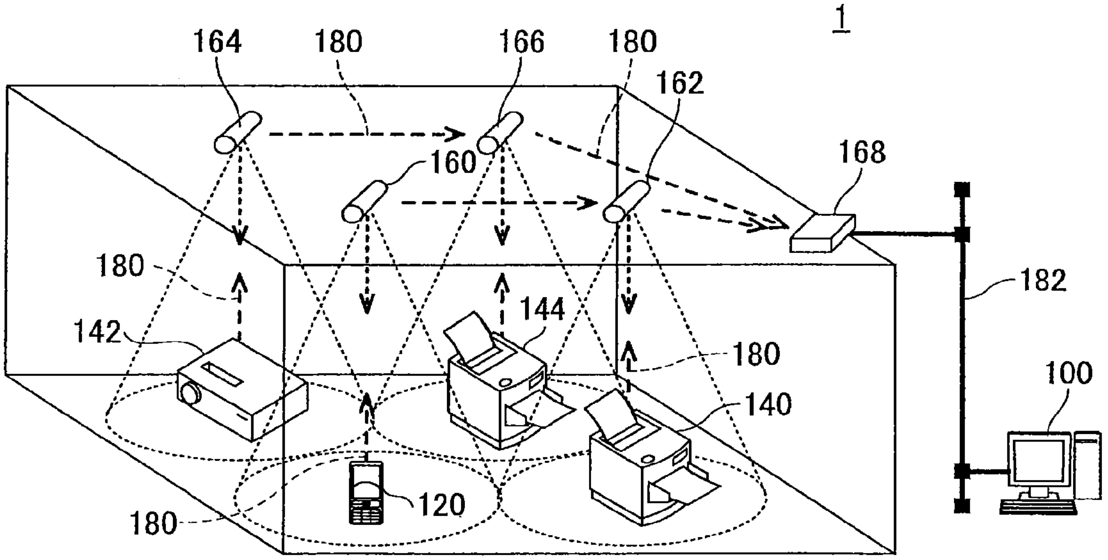
FIG. 1 is a drawing illustrating an overview of an information providing system according to an embodiment of this invention.
Figure 1:
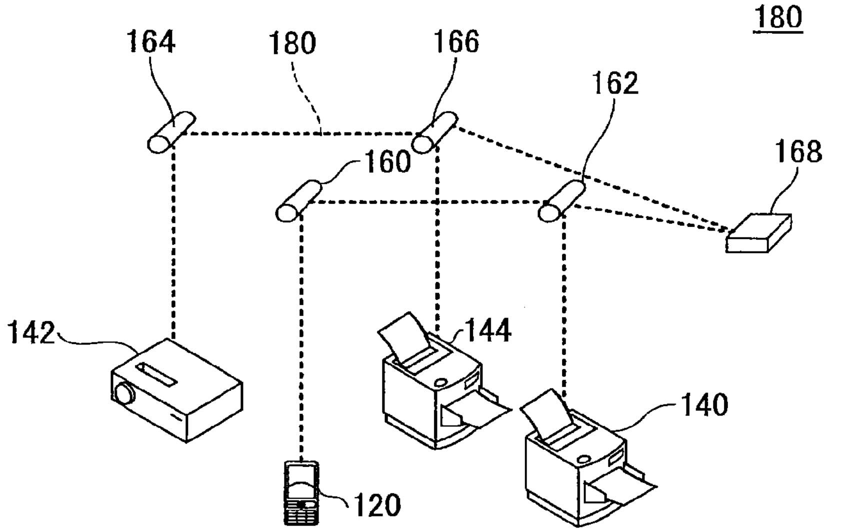

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

1. System Overview
1.1 Obtaining Position Data
1.2 Executing Process on Apparatus
2. Hardware Configurations
3. Functions
3.1 Obtaining Position Data
3.2 Executing Process on Apparatus
4. Process Flow
4.1 Obtaining Position Data
4.2 Executing Process on Apparatus
5. Variants (1. System Overview)

FIG. 1 shows an office environment in which an information providing system 1 according to an embodiment of this invention is installed. FIG. 1 also shows a relationship of the office and a server installed outside of the office. The system shown in FIG. 1 includes the server (information providing device) 100, an information processing terminal 120, apparatuses (information processing apparatuses) 140-144 (in particular, a printer 140, a projector 142 and a multifunction peripheral (MFP) 144), broadcasting devices 160-166, and a gateway 168. The information processing terminal 120, the printer 140, the projector 142, the MFP 144, the broadcasting devices 160-166, and the gateway 168 are connected with a network 180. The gateway 168 and the server 100 are connected with a network 182.

In the system 1, the server 100 obtains position data of the information processing terminal 120, the printer 140, the projector 142 and the MFP 144 through the broadcasting devices 160-166. The server 1 transmits to the information processing terminal 120 data of the apparatuses 140-144 which are in the same region with the information processing terminal 120. The user of the information processing terminal

120 operates the information processing terminal 120 to allow the desired apparatus to execute a certain process. In the following description, processes are explained to obtain the position data of the information processing terminal 120 and the apparatuses and to execute a process on the desired apparatus.

(1.1 Obtaining Position Data)

First, the process to obtain the position data of the information processing terminal 120, the printer 140, the projector 142, and the MFP 144 is explained in the system 1.

The information processing terminal 120 is a terminal such as a laptop, a tablet, or a smartphone, which is movable and connectable to a network such as the Internet or an intranet.

The printer 140 may accept a request to print through a network. The projector 142 may project a content of a file on a screen input from a network. The MFP 144 has a printing function through a network as well as a storage function to store a file locally transmitted by other devices. The name, identification data, and function data (device data or apparatus data) of such apparatuses are obtained by the server 100 in advance and stored in an apparatus data storage table shown in FIG. 14.

The broadcasting devices 160-166 may be installed on a ceiling of a room, and continuously or intermittently wirelessly transmit their position data representing installed locations, which is expressed by degrees of latitude and longitude, a floor number, and a building number. Each of the broadcasting devices 160-166 has a chassis and may operate with power provided by an existing power source. Alternatively, the broadcasting devices 160-166 are incorporated in lighting apparatuses such as LED fluorescent tubes and powered by the lighting apparatuses, respectively. The broadcasting devices 160-166 wirelessly transmit the position data for predetermined areas, respectively. A size of the predetermined area is determined depending on strength of a wireless signal used by each broadcasting device. The broadcasting devices 160-166 are placed so as to cover a whole region to be managed as a whole. The broadcasting devices 160-166 are installed so that the areas to which the wireless signals are transmitted are not overlapped. Alternatively, when the areas are overlapped, the information processing terminal 120 receiving the several position data sets may determine one of the position data sets to be used based on radio wave field strengths. In FIG. 1, dashed lines under the broadcasting devices 160-166 indicate the predetermined area. The position data may be transmitted with Indoor Messaging System (IMES). The position data of the installed broadcasting devices is stored in a broadcasting device data storage table shown in FIG. 12. The broadcasting device data storage table is stored in the server 100 described later.

The information processing terminal 120, the printer 140, the projector 142, and the MFP 144 may receive the wireless signal transmitted by the nearest one of the broadcasting devices 160-166. The information processing terminal 120, the printer 140, the projector 142, and the MFP 144 are placed in the area to which the broadcasting devices 160-166 transmit the wireless signals and may receive the position data from the broadcasting devices, respectively. The position data from the broadcasting devices 160-166 may be received with IMES. The information processing terminal 120, the printer 140, the projector 142, and the MFP 144 transmit to the broadcasting devices 160-166 data including the identification data (e.g. a network address) as well as the received position data. The information processing terminal 120, the printer 140, the projector 142, and the MFP 144 transmit the data through the network 180 according to a short range wireless communication protocol such as IEEE 802.15.4 and ZigBee (trademark). In this case, a short address in IEEE 802.15.4 or an IEEE extended address (a MAC address) may be used as the identification data for the information processing terminal 120, the printer 140, the projector 142, and the MFP 144. The identification data and the position data transmitted to the broadcasting devices 160-166 are conveyed to the gateway 168 via the neighboring broadcasting devices. The information processing terminal 120, the printer 140, the projector 142, and the MFP 144 may transmit the data at any timing (e.g. at certain intervals, on a certain time or responding to user's operation).

The network 180 forms a personal area network (PAN) to which the information processing terminal 120, the printer 140, the projector 142, the MFP 144, the broadcasting devices 160-166, and the gateway 168 are connected according to IEEE 802.15.4 and ZigBee (trademark) standard. FIG. 1 (B) shows only elements forming the network 180 extracted from FIG. 1 (*a*). When the PAN is formed according to IEEE 802.15.4 and ZigBee standard, the information processing terminal 120, the printer 140, the projector 142, and the MFP 144 operate as End Devices, the broadcasting devices 160-166 operate as Routers, and the gateway 168 operates as a Coordinator specified in ZigBee (trademark) standard. Thus, the information processing terminal 120, the printer 140, the projector 142, the MFP 144, and the broadcasting devices 160-166 form the PAN under control of the gateway 168. The shortest routing path from each terminal or apparatus to the gateway 168 is calculated responding to the formation of the PAN. In addition, the network 182 to which the gateway 168 and the server 100 are connected may form a local area network (LAN) according to IEEE 802.3.

The gateway 168 connects the network 180 with the network 182, and conveys the data transmitted from the network 180 to the network 182. The gateway 168 may be installed per floor in a building or per room separated with a wall. When the network 180 forms the PAN conforming to IEEE 802.15.4 and ZigBee™ and the network 182 forms the LAN conforming to IEEE 802.3 standard, the gateway 168 may convert the data between the networks. In addition, when the identification data is expressed by the short address of IEEE 802.15.4, the gateway 168 may convert the short address into the IEEE extended address based on information about the PAN configuration and transmit the IEEE extended address to the server 100.

The server 100 may store the identification data and the position data transmitted from the information processing terminal 120, the printer 140, the projector 142, and the MFP 144 via the gateway 168 as well as data representing receipt date and time. Such data may be stored in a position data management table shown in FIGS. 13A-13D.

(1.2 Executing Process on Apparatus)

Figure 17:
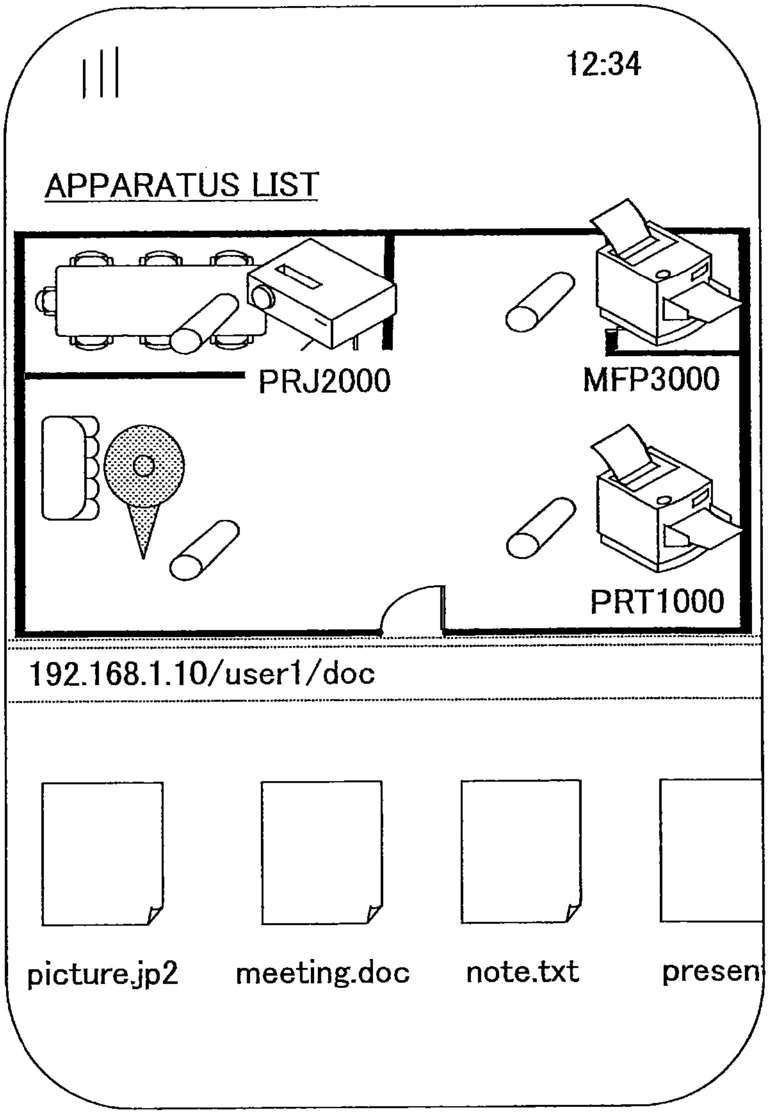
FIG. 17 is a drawing illustrating an example of a screen displayed on an information processing terminal according to an embodiment of this invention.
Figure 18:
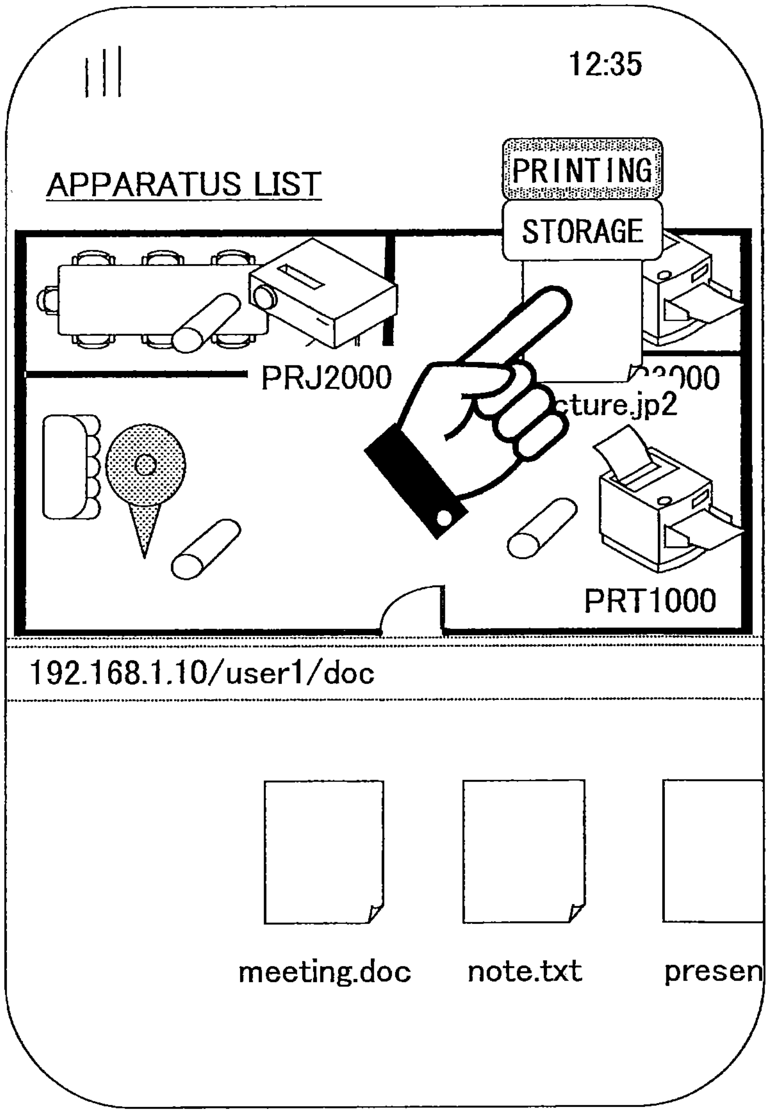
FIG. 18 is a drawing illustrating an example of a screen displayed on an information processing terminal according to an embodiment of this invention.

The server 100, using the position data obtained in the above process, specifies the region where the information processing terminal 120 is, and specifies the apparatus(es) which are in the region. The server 100 transmits to the information processing terminal 120 information about the apparatuses (e.g. information including the position data, the names of the apparatuses, names of functions provided by the apparatuses, and data types supported by the apparatuses). The region determined by the position data may be defined in a region data table shown in FIG. 15 in advance. The information processing terminal 120 displays apparatuses on a map using the information about the apparatuses and accepts user's instructions (input operations). The user may instruct the apparatus to execute a desired process using an input unit of the information processing terminal 120 (e.g. a mouse, a trackball or a touch panel). FIGS. 17, 18 show screens of the information processing terminal 120 and an example of user's operation (details about FIGS. 17, 18 are described later). FIG. 17 shows an example of the screen displaying a list of the information about the apparatuses displayed on the map and files to be input. FIG. 18 shows an example of the screen when the user's operation is performed. As shown in FIG. 18, the user may choose a process when the apparatus has several functions for a file specified by the user. The information processing terminal 120 transmits to the server 100 information about the file, the apparatus, and the process specified by the user. The server 100 instructs the apparatus to execute the process specified by the user of the information processing terminal 120 based on the received information. The server 100 may use a command and a required protocol for such instruction to allow the printer 140, the projector 142, or the MFP 144 to execute the process.

In the system 1 according to an embodiment of this invention, the information processing terminal 120 may allow the apparatuses 140-144 which are in the same region with the information processing terminal 120 to execute the process specified by the user without connection configuration for the apparatuses 140-144.

(2. Hardware Configurations)

Figure 2:
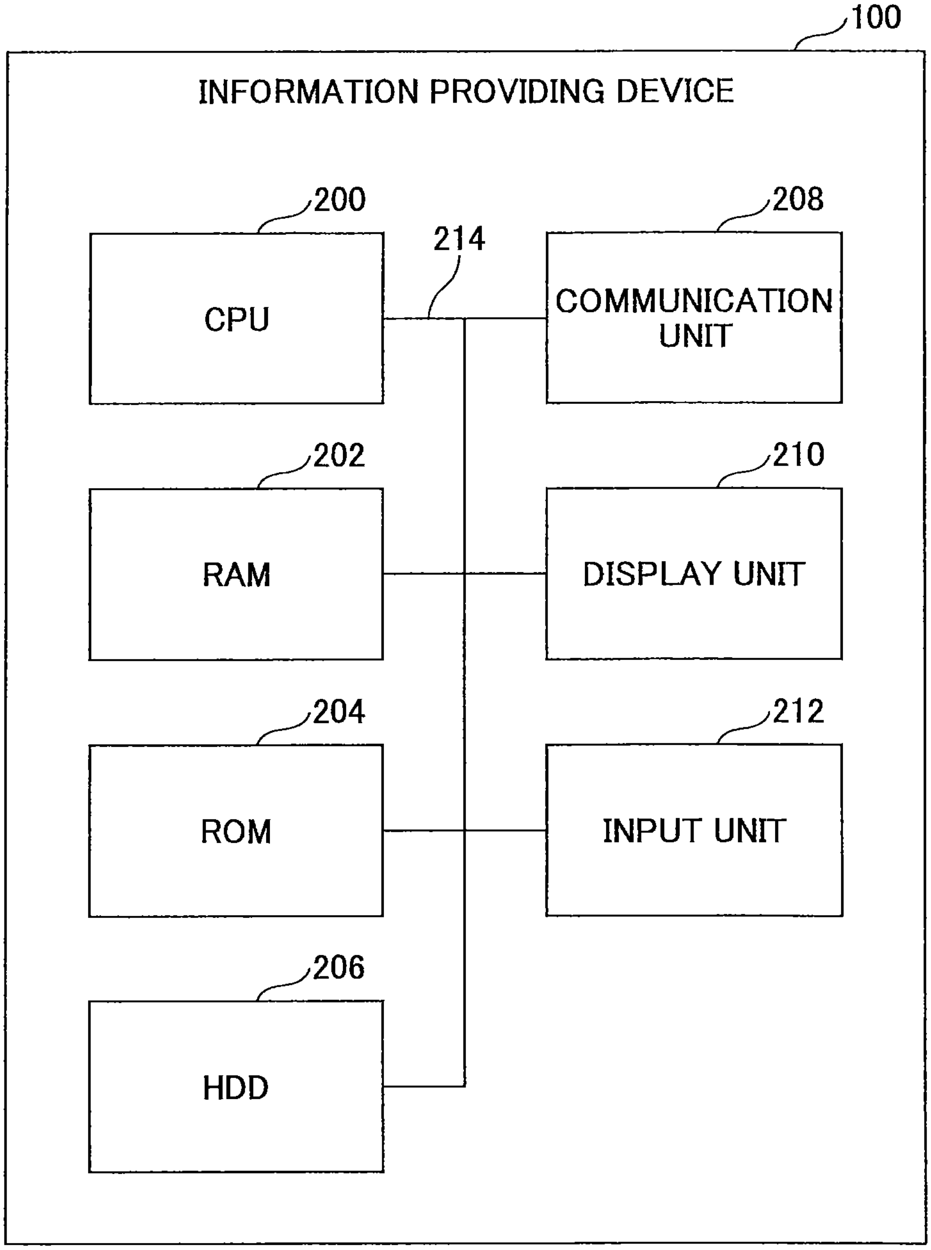
FIG. 2 is a block diagram illustrating an exemplary hardware configuration of an information providing device according to an embodiment of this invention.
Figure 3:
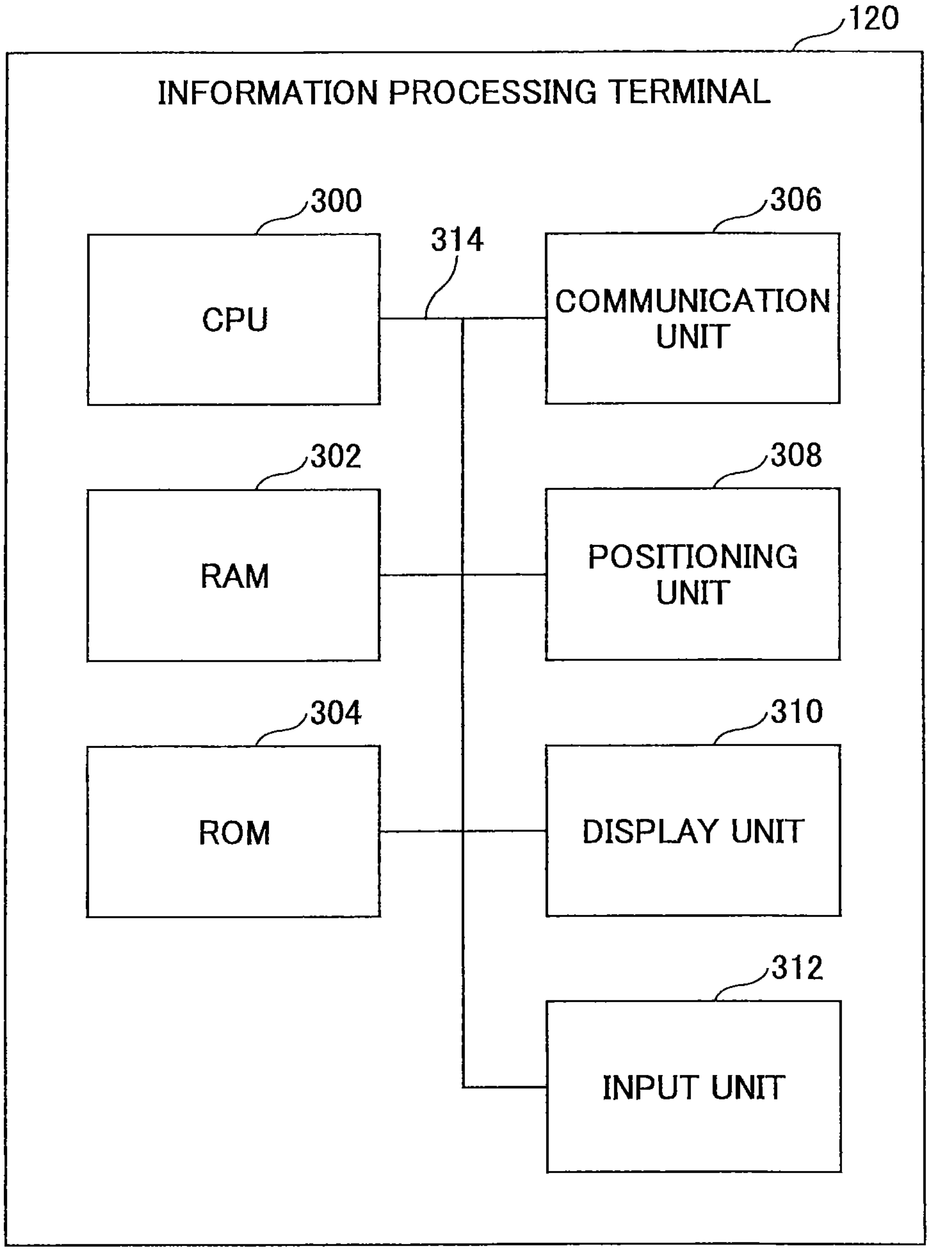
FIG. 3 is a block diagram illustrating an exemplary hardware configuration of an information processing terminal according to an embodiment of this invention.
Figure 4:
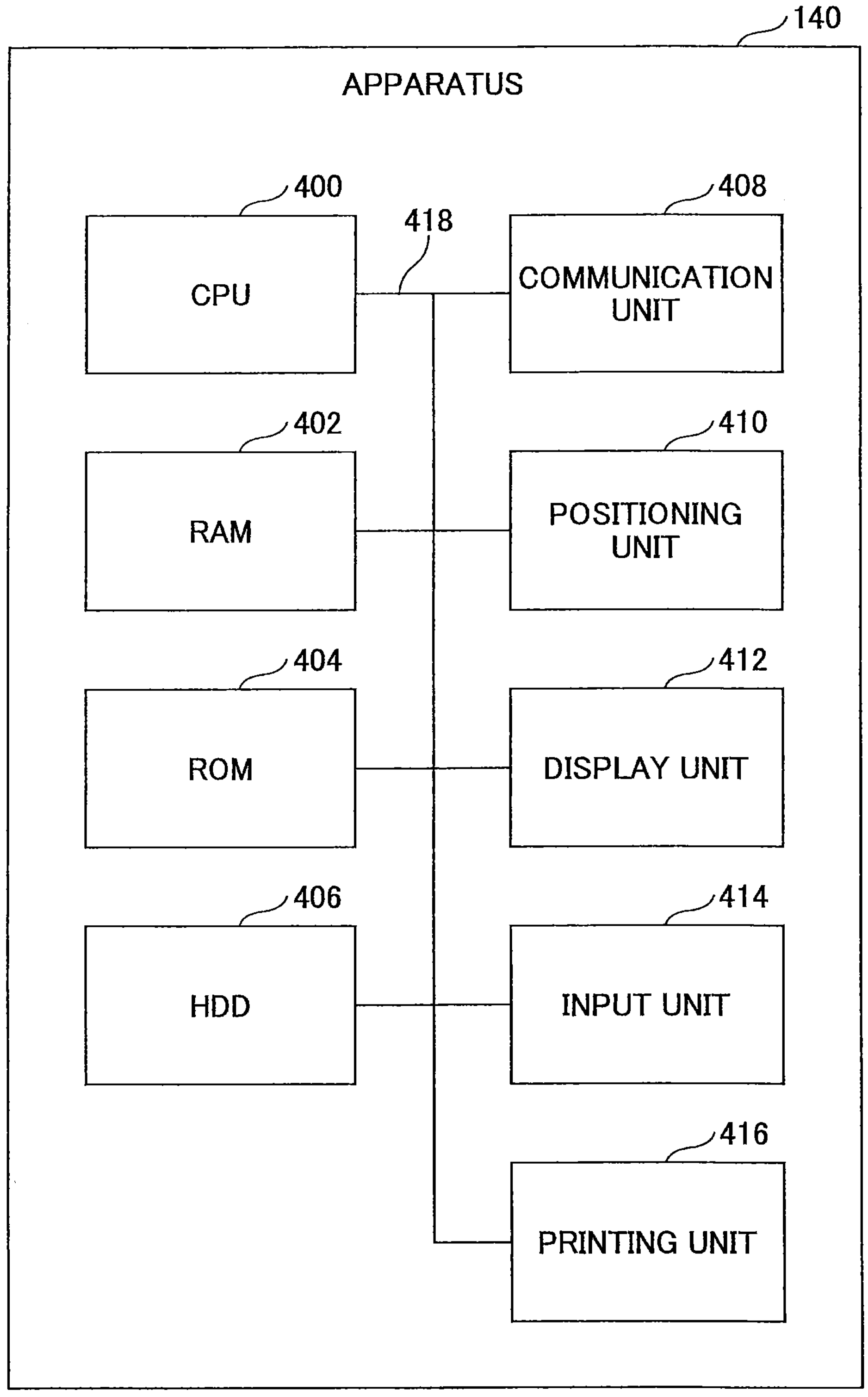
FIG. 4 is a block diagram illustrating an exemplary hardware configuration of an apparatus according to an embodiment of this invention.

Next, with reference to FIGS. 2-4, hardware configurations are explained for the server 100, the information processing terminal 120, and the apparatuses 140-144 (the apparatus 140 (the printer) is used for the following explanation).

FIG. 2 shows an exemplary hardware configuration of the server 100 according to an embodiment of this invention. The server 100 includes a CPU 200, a RAM 202, a ROM 204, a HDD 206, a communication device 208, a display device 210, an input device 212, and a bus 214.

The CPU 200 executes programs controlling the server 100. The RAM 202 may operate as a working memory for the CPU 200. The ROM 204 stores a boot program executed by the CPU 200. The HDD 206 stores system programs such as an operation system (OS), user applications and data. The communication device 208, including a LAN interface, may communicate with an external device. The display device 210, such as a liquid crystal display, may provide visual information to the user. The input device 212, such as a keyboard or a mouse, may accept input from the user. The bus 214 interconnects the above devices electrically.

With the above stated configuration, the server 100 according to an embodiment of this invention may obtain the position data of the apparatus 140 and specify the apparatus 140 which is in the same region with the information processing terminal 120. Also, the server 100 may transmit to the information processing terminal 120 the information about the apparatus 140 which is in the same region with the information processing terminal 120, receive the processing request for the apparatus 140, and allow the apparatus 140 to perform the process.

FIG. 3 shows an exemplary hardware configuration of the information processing terminal 120 according to an embodiment of this invention. The information processing terminal 120 includes a CPU 300, a RAM 302, a ROM 304, a communication device 306, a positioning device 308, a display device 310, an input device 312, and a bus 314.

The CPU 300 executes programs controlling the information processing terminal 120. The RAM 302 may operate as a working memory for the CPU 300. The ROM 304 stores a boot program executed by the CPU 300 as well as system programs such as an OS, user applications and data. The communication device 306 may communicate with an external device via a wireless LAN and/or a PAN. The positioning device 308 may receive positional signal according to IMES, which is transmitted by the broadcasting device 160. The display device 310, such as a liquid crystal display, may provide visual information to the user. The input device 312, such as a touch panel, may accept input from the user. The bus 314 interconnects the above devices electrically.

With the above configuration, the information processing terminal 120 according to an embodiment of this invention may transmit to the server 100 the identification data as well as the position data received from the broadcasting device 160. Also, the information processing terminal 120 may receive information about the apparatus 140 which is in the same region with the information processing terminal 120, and show the list of the apparatuses 140-144. Furthermore, the information processing terminal 120 may accept user's input operation, and request the server 100 to allow the apparatus 140 to execute the process specified by the user.

FIG. 4 shows an exemplary hardware configuration of the apparatus (printer) 140 according to an embodiment of this invention. The apparatus 140 includes a CPU 400, a RAM 402, a ROM 404, a HDD 406, a communication device 408, a positioning device 410, a display device 412, an input device 414, a printing device 416 and a bus 418.

The CPU 400 executes programs controlling the apparatus 140. The RAM 402 may operate as a working memory for the CPU 400. The ROM 404 stores a boot program executed by the CPU 400. The HDD 406 stores system programs such as an OS, user applications and data. The communication device 408 may communicate with an external device via a wireless LAN and/or a PAN. The positioning device 410 may receive positional signals according to IMES, which are transmitted by the broadcasting device. The display device 412, such as a liquid crystal display, may provide visual information to the user. The input device 414, such as a touch panel, may accept input from the user. The printing device 416 may print an image on paper with toner. The bus 418 interconnects the above devices electrically.

With the above stated configuration, the apparatus 140 according to an embodiment of the invention may transmit to the server 100 the position data received from the broadcasting device 160. In addition, the apparatus 140 may perform the process requested by the information processing terminal 120 which is in the same region with the apparatus 140.

(3. Functions)

Figure 5:
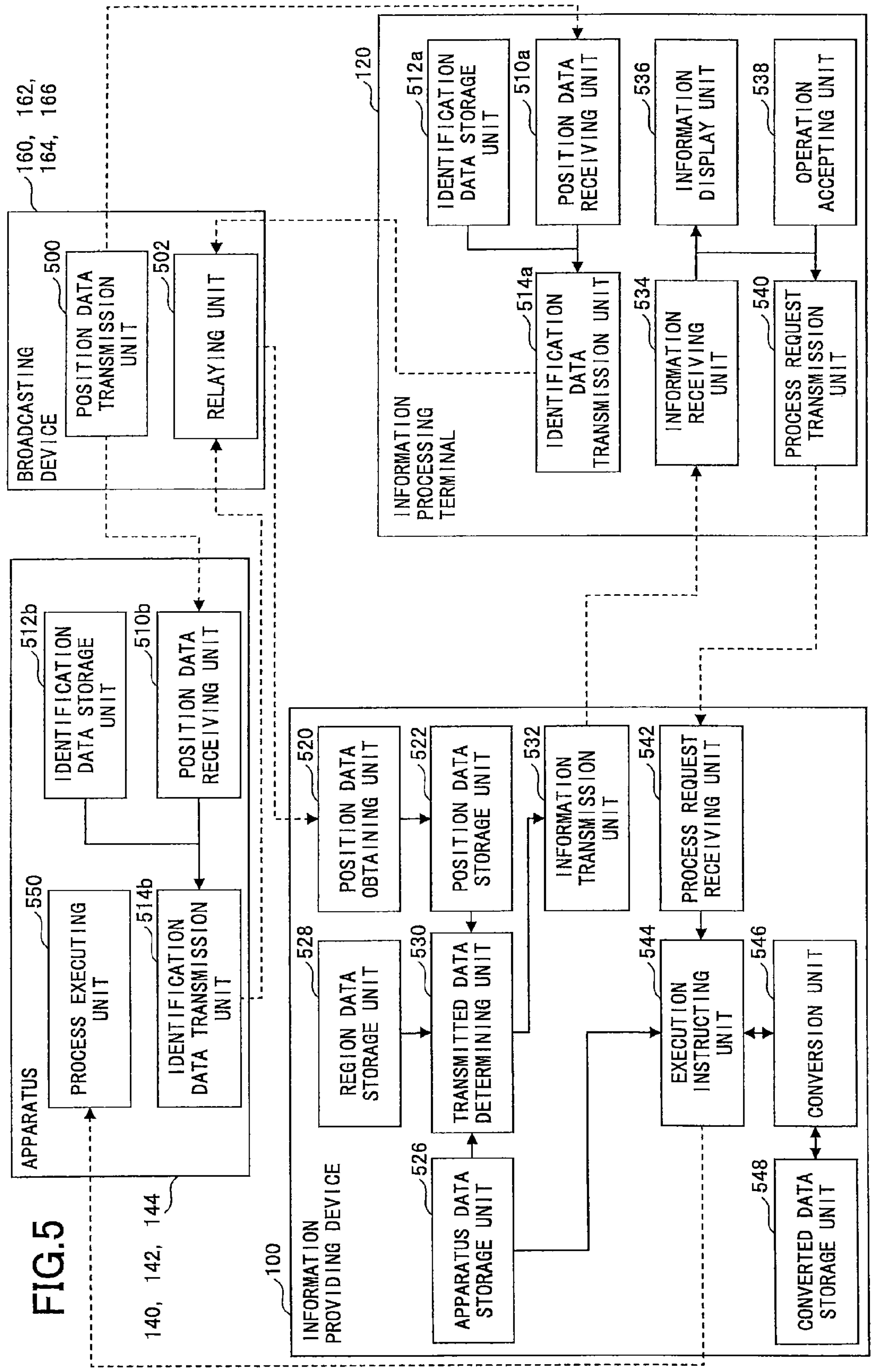
FIG. 5 is a block diagram illustrating exemplary functional configurations of an information providing device, an apparatus, and a broadcasting device according to an embodiment of this invention.

With reference to FIG. 5, the configuration of the function block is explained for the server 100, the information processing terminal 120, the apparatus 140, and the broadcasting devices 160-166 (only the broadcasting device 160 is used for the following explanation). Here, the functions are explained separated into two parts—obtaining position data and executing a process on the apparatus.

(3.1 Obtaining Position Data)

The broadcasting device 160 includes a position data transmission unit 500 and a relaying unit 502.

The position data transmission unit 500 transmits the position data (e.g. degrees of latitude and longitude, a floor number, and a building number) of the location where the broadcasting device 160 is installed to a certain area according to the format defined by IMES shown in FIG. 12. The position data transmission unit 500 according to an embodiment may transmit the position data indicating north latitude of 35.459400 degrees, east longitude of 139.387100 degrees, 16th floor, and "C" building, for example.

The relaying unit 502 relays to the server 100 the position data and the identification data transmitted from the information processing terminal 120 and the apparatus 140. When the network 180 is formed based on ZigBee™, using a ZigBee Router function, the relaying unit 502 performs the relaying process.

The apparatus 140 includes a position data receiving unit 510*b*, an identification data storage unit 512*b*, and an identification data transmission unit 514*b*. Other functions are described later.

The position data receiving unit 510*b* receives the position data transmitted by the position data transmission unit 500 of the broadcasting device 160. The position data receiving unit 510*b* may receive the position data at predetermined intervals and/or time. Alternatively, the position data receiving unit 510*b* may receive the position data responding to user's operation and/or notification from the server 100.

The identification data storage unit 512*b* stores the identification data of the apparatus 140. The identification data of the apparatus 140 may be used to identify the apparatus 140 on the system 1 such as a network address of the apparatus 140. When the network 180 is formed according to IEEE 802.15.4 and ZigBee™ standard, the identification data is expressed by the short address of IEEE 802.15.4 or IEEE extended (MAC) address.

The identification data transmission unit 514*b* transmits to the broadcasting device 160 the position data received by the position data receiving unit 510*b* and the identification data stored in the identification data storage unit 512*b*. FIG. 21 shows a specific example of the position data and the identification data transmitted by the identification data transmission unit 514*b*. In this example, the identification data transmission unit 514*b* transmits the identification data of the apparatus 140 "002673abcd01" and the poison data "north latitude of 35.459400 degrees, east longitude of 139.387100, 16th floor, and C building". The position data received by the position data receiving unit 510*b* may be expressed by the IMES format. However, the data may be converted into any formats with any structures. The transmitted data is conveyed to the server 100 via the broadcasting devices 160-166 and gateway 168 (i.e. via the networks 180, 182).

The identification data transmission unit 514 may transmit to the server 100 the identification data and the position data at predetermined intervals and/or time. Alternatively, the identification data transmission unit 514*b*, responding to a user's operation and/or a notification from the server 100, may transmit the identification data and the position data to the server 100. When the network 180 is formed according to ZigBee™, using ZigBee End Device function, the identification data transmission unit 512*b* performs the transmission process.

The information processing terminal 120 includes a position data receiving unit 510*a*, an identification data storage unit 512*a*, and an identification data transmission unit 514*a*. The information processing terminal 120 transmits to the broadcasting device 160 the position data received from the broadcasting device 160 and the identification data of the information processing terminal 120. Other functions are described later.

The server 100 includes a position data obtaining unit 520 and a position data storage unit 522. Other functions are described later.

The position data obtaining unit 520 obtains the identification data and the position data of the apparatus 140 and the information processing terminal 120 transmitted through the broadcasting device 160 and the gateway 168. The position data obtaining unit 520 transfers the obtained identification data and the position data to the position data storage unit 522.

The position data storage unit 522 stores the obtained position data of the apparatus 140 and the information processing terminal 120 with respect to each identification data. For example, the position data management table shown in FIGS. 13A-13D stores the position data. The position data management table shown in FIG. 13A stores the position data of the information processing terminal 120. The position data management table shown in FIG. 13B stores the position data of the apparatus 140. The position data management table shown in FIG. 13C stores the position data of the apparatus 142. The position data management table shown in FIG. 13D stores the position data of the apparatus 144.

With the above stated function, the server 100 according to an embodiment of this invention may obtain the position data of the information processing terminal 120 used by the user and the apparatus 140 such as a printer.

(3.2 Executing Process on Apparatus)

The server 100 also includes an apparatus data storage unit 526, a region data storage unit 528, a transmitted data determining unit 530, and an information transmission unit 532. The remaining functions are described later.

The apparatus data storage unit 526 stores apparatus data of the apparatuses 140-144 managed by the server 100. The apparatus data may be defined by an apparatus data storage table shown in FIG. 14 in advance. The apparatus data storage table includes the following items.

NUMBER: sequential number per item;

APPARATUS NAME: the name of the apparatus;

IDENTIFICATION DATA: the identification data uniquely assigned to the apparatus such as a MAC address (corresponding to the identification data transmitted by the apparatus);

FUNCTION NAME: the names of functions supported by the apparatus (e.g. print, display, storage, etc.); and SUPPORT FORMAT: input file formats supported by the apparatus (e.g. jpg, doc, pdf, etc.)

The apparatus data storage unit 526 may be deployed on an external server, and the server 100 may refer to the apparatus data storage table.

The region data storage unit 528 stores region data which defies a region such as an office area. The region data may be defined with a region data table shown in FIG. 15 in advance. In the region data table shown in FIG. 15, some oblong regions are defined per floor, whose borders are expressed by degrees of latitude (i.e. a north end and a south end) and longitude (an east end and a west end).

The transmitted determining unit 530 refers to the position data of the information processing terminal 120 stored in the position data storage unit 522.

Figure 6:
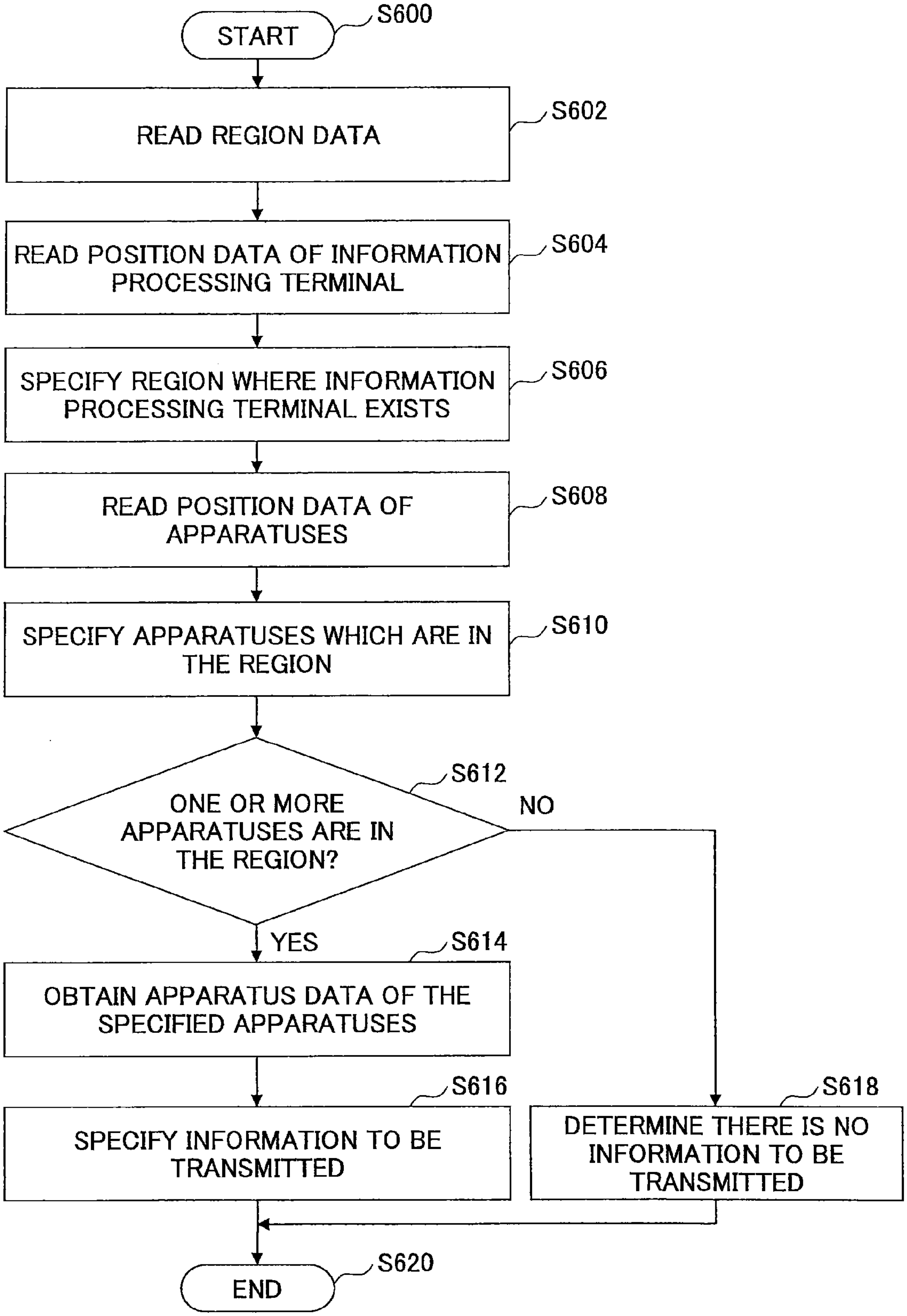
FIG. 6 is a flowchart illustrating a process performed by a transmitted data determining unit of an information providing device according to an embodiment of this invention.

Next, the transmitted determining unit 530 specifies information about the apparatuses 140-144 which are in the same region with the information processing terminal 120, which is transmitted to the information processing terminal 120. The transmitted determining unit 530 may specify the region in which the information processing terminal 120 is, by referring to the region data table shown in FIG. 15. The transmitted determining unit 530 searches for the apparatuses 140-144 which are in the specified region using the position data stored in the position data storage unit 522. In this way, the transmitted determining unit 530 may specify the apparatuses 140-144 which are in the same region with the information processing terminal 120. The transmitted determining unit 530 obtains the apparatus data and the position data of the apparatuses 140-144 from the apparatus data storage unit 526 and the position data storage unit 522, and determines which data is included in the information to be transmitted (includes all or some of the obtained data). The transmitted determining unit 530 transfers the information to be transmitted to the information transmission unit 532. The transmitted determining unit 530 may specify any data to be included in the information to be submitted. For example, the transmitted determining unit 530 may specify the position data (i.e. degrees of latitude and longitude, a floor number, a building number, receipt date and time) and the apparatus data (i.e. an apparatus name, a function name, a supported storage) to be included in the information to be transmitted. Alternatively, the transmitted determining unit 530 may specify a subset of the data (e.g. identification data, degrees of latitude and longitude, a floor number, a building number, an apparatus name, a function name) to be included in the information to be transmitted. It is determined by a user of the information providing device 100 which data is specified to be included in the information to be transmitted in advance. If there is no apparatus in the region where the information processing terminal 120 is, the transmitted data determining unit 530 determines that there is no information about the apparatus to be transmitted. The transmitted data determining unit 530 transmits a notification that there is no information to be transmitted to the information transmission unit 532. A flowchart of the process stated above is shown in FIG. 6 (details are described later).

The position data management table shown in FIG. 13A stores the following position data of the information processing terminal 120.

LATITUDE: 35.459400

LONGITUDE: 139.387100

FLOOR: 16

BUILDING: C

RECEIPT DATA AND TIME: Apr. 5, 2012 15:00:00

The transmitted determining unit 530 refers to the region data table shown in FIG. 15, and determines that the information processing terminal 120 is in a region "C16-S Side". Next, the transmitted determining unit 530 searches for the apparatuses which are in "C16-S Side" in the position data management table. The transmitted determining unit 530 determines that any of the apparatuses 140-144 are in "C16-S Side" using the position data management table shown in FIGS. 13B-13D. Next, The transmitted determining unit 530 obtains the apparatus data of each apparatus from the apparatus data storage table using the identification data of the apparatuses 140-144. Also, the transmitted determining unit 530 obtains the present position data of the apparatuses from the position data management tables shown in FIG. 13B, 13C, 13D. The transmitted determining unit 530 temporarily stores the obtained data in a table shown in FIG. 16. The item 1600 shown in FIG. 16 is obtained from the position data management tables shown in FIGS. 13A-13D, and the item 1610 is obtained from the apparatus data storage table shown in FIG. 14. Here, the transmitted determining unit 530 determines that the information shown in FIG. 16 including all obtained data has to be transmitted. The information providing device 100 may transmit to the information processing terminal 120 the information via not the networks 180, 182 but a wireless network. Alternatively, the information providing device 100 may transmit to the information processing terminal 120 the information via the network 180 (PAN).

The information transmission unit 532 transmits to the information processing terminal 120 the information transferred from the transmitted data determining unit 530, which includes the position data and the apparatus data of the apparatuses which are in the same region with the information processing terminal. When the information transmission unit 532 receives the information indicating there is no information about the apparatus to be transmitted, the information transmission unit 532 transmits the information indicating that to the information processing terminal 120. The information transmission unit 532 forms the information to be transmitted with any formats, and transmits to the information processing terminal 120 the information via the networks 180, 182 or a wireless network.

The information processing terminal 120 further includes an information receiving unit 534, an information display unit 536, an operation accepting unit 538, and a process request transmission unit 540.

The information receiving unit 534 receives the information about the apparatuses (FIG. 16) which are in the region where the information processing terminal 120 is, which is transmitted by the information transmission unit 532 of the information providing device 100. Alternatively, the information receiving unit 534 receives information indicating there is no information about the apparatus to be transmitted from the information transmission unit 532 of the information providing device 100.

The information display unit 536 displays a screen indicating positions of the apparatuses which are in the same region with the information processing terminal 120 using the information about the apparatus received by the information receiving unit 534. FIG. 17 shows an example of the screen indicating the positions of the apparatuses. FIG. 17 shows an example of the screen displayed on the information processing terminal 120 as a smart phone. In FIG. 17, icons indicating "PRT1000" (corresponding to the apparatus 140), "PRJ2000" (corresponding to the apparatus 142), and "MFP3000" (corresponding to the apparatus 144) are displayed with a map. The name of the apparatus corresponds to "APPARATUS NAME" included in the information about the apparatus received by the information receiving unit 534. The positions of the icons on the map are determined based on "LATITUDE", "LONGITUDE", "FLOOR", and "BUILDING" included in the information about the apparatuses received by the information receiving unit 534. The map data may be stored in the information processing terminal 120 in advance, or may be obtained from an external server. Image data of the icon may also be stored in the information processing terminal 120. The information display unit 536 may display a list of files stored in any device at the bottom of the screen. In FIG. 17, icons for files stored in a directory "192.168.1.10/user1/doc/" are shown as well as the file names. The files such as "picture.jp2", "meeting.doc", and "note.txt" are stored in the directory in a storage device of either the information processing terminal 120 or the external server. The file "picture.jp2" is formed conforming to JPEG2000 format, "meeting.doc" is formed conforming to Microsoft Word format, and "note.txt" is a text file. When the information transmission unit 532 of the information providing device 100 transmits the information indicating there is no information about the apparatuses, the information display unit 536 may show a message indicating "There is no apparatus in the same region with this terminal" on the screen.

The operation accepting unit 538 accepts an input operation from the user of the information processing terminal 120. With reference to FIG. 18, the operation which the operation accepting unit 538 accepts is explained. FIG. 18 shows a screen displayed after a drag operation performed by the user on the touch screen, which places the file icon as displayed in FIG. 17 on the apparatus icon. In FIG. 18, the user performs the operation for the purpose of allowing "MFP3000" to process the file "picture.jp2" formed in JPEG2000 format. Here, the functions which the apparatus "MFP3000" has are identified as "PRINTING" and "STORAGE" based on the information about the apparatus received by the information receiving unit 534. In FIG. 18, the operation accepting unit 538 displays a list of "FUNCTION NAME" and has the user choose one function. When the apparatus has a single function, the list may not be shown. In sum, the operation accepting unit 538, by the above stated operations from the user, may specify the following information.

- input file information (e.g. 192.168.1.10/user1/doc/picture.jp2);
- the identification data of the apparatus which performs processing (e.g. "002000abcd03"); and
- processing information indicating the processing (e.g. "PRINTING").

The operation accepting unit 538 transfers the specified information to the process request transmission unit 540. FIG. 22 shows an example of the information which the operation accepting unit 538 conveys to the process request transmission unit 540. Here, "input file information" includes a string "192.168.1.10/user1/doc/picture.jp2". In addition, "002000abcd03" is specified as the identification data which performs the processing. Furthermore, "processing information" includes a string "PRINTING" indicating the processing performed by the apparatus.

The input file information may be expressed by a combination of a network path and a file name. In the above example, "picture.jp2" is stored locally. However, the input file may be stored in the storage device on the Internet or a cloud system. The input file information is expressed depending on the storage device where the file is stored. When the input file is stored in the information processing terminal 120, the operation accepting unit 538 may transfer the file itself to the process request transmission unit 540.

The process request transmission unit 540 transmits to the information providing device 100 the information specified by the operation accepting unit 538 based on the user operation, thereby requesting the information providing device 100 to cause the apparatus to execute the processing specified by the information. The information processing terminal 120 may transmit to the information providing device 100 the information via a wireless network which differs from the networks 180, 182. Alternatively, the information processing terminal 120 may transmit to the information providing device 100 the information via the existing network (PAN) 180.

The information providing device 100 further includes a process request receiving unit 542, an execution instructing unit 544, a conversion unit 546, and a converted data storage unit 548.

The process request receiving unit 542 receives a request including the following information from the process request transmission unit 504 of the information processing terminal 120.

- input file information (e.g. 192.168.1.10/user1/doc/picture.jp2);
- the identification data of the apparatus which performs processing (e.g. "002000abcd03"); and
- processing information indicating the processing (e.g. "PRINTING").

The process request receiving unit 542 transfers the information to the execution instructing unit 544.

The execution instructing unit 544, using the information conveyed from the process request receiving unit 542, instructs the specified apparatus to execute the specified processing. Here, the execution instructing unit 544 may instruct the apparatus to execute the processing with the following command. For example, the instruction causing the apparatus 140 (printer) to execute "PRINTING" processing for the input file is implemented by a lpr command for a UNIX™ system or a HTTP and XML request in a certain form.

```
<An example of the lpr command>
lpr -P PRINTER_NAME FILE_NAME
<An example of the HTTP and XML request>
  POST /document HTTP/1.0
  Content-Type: text/xml;charset=UTF-8
  Content-Length:xxx
  <?xml version="1.0" ?>
  <operation>
  <print>
  <file>file name</file>
  </print>
  </operation>
```

Here, the name of the input file to be printed is specified as PRINTER_NAME. The above example shows an example of a command for printing; however, a format of the command or protocol is different depending on the apparatus or the processing. In this invention, any other commands or protocols may be used. The execution instructing unit 544 may issue any commands such as the lpr command corresponding to each function of each apparatus. Also, a format of the command may be different depending on kinds of the apparatus or the processing. Thus, the format information may be obtained in advance, or may be timely obtained via the network. In a case where the command for the apparatus fails, the execution instructing unit 544 receives an error notification from the apparatus. In this case, the execution instructing unit 544 notifies the information processing terminal 120 of an occurrence of the error.

When the format of the input file specified by the user is not supported by the apparatus for the processing, the execution instructing unit 544 causes the conversion unit 546 to convert the format of the input file. For this end, the execution instructing unit 544 transfers the input file to be converted and the target format to the conversion unit 546. For example, the user instructs "MFP3000" to perform "PRINTING" for "picture.jp2" whose format is JPEG2000 shown in FIG. 18. The execution instructing unit 544 refers to the table shown in FIG. 16 storing the apparatus data and the position data of the apparatus, and determines that "MFP3000" does not support "JPEG2000" (jp2) format. In this case, the execution instructing unit 544 specifies the original file "picture.jp2" and the target file format "JPEG", and instructs the conversion unit 546 to convert the file. Mutually convertible formats (e.g. JPEG2000, JPEG, GIF, PNG, etc.) are defined in advance. In addition, when an unsupported file format is specified, it is defined which format is used as the target format (e.g. when a JPEG2000 file is specified, the file is converted into a JPEG format). The conversion is done not only between image or movie files but also between a document and an image file. When the conversion is successfully done, the execution instructing unit 544 receives information about the converted file (the file itself or path to the file) from the conversion unit 546. The execution instructing unit 544 instructs the apparatus 140 to execute the processing using the information. On the other hand, when the conversion fails or the specified format is not supported, the execution instructing unit 544 receives an error notification from the conversion unit 546. In this case, the execution instructing unit 544 stops the process of instructing the apparatus, and sends a notification to the information processing terminal 120.

Figure 7:
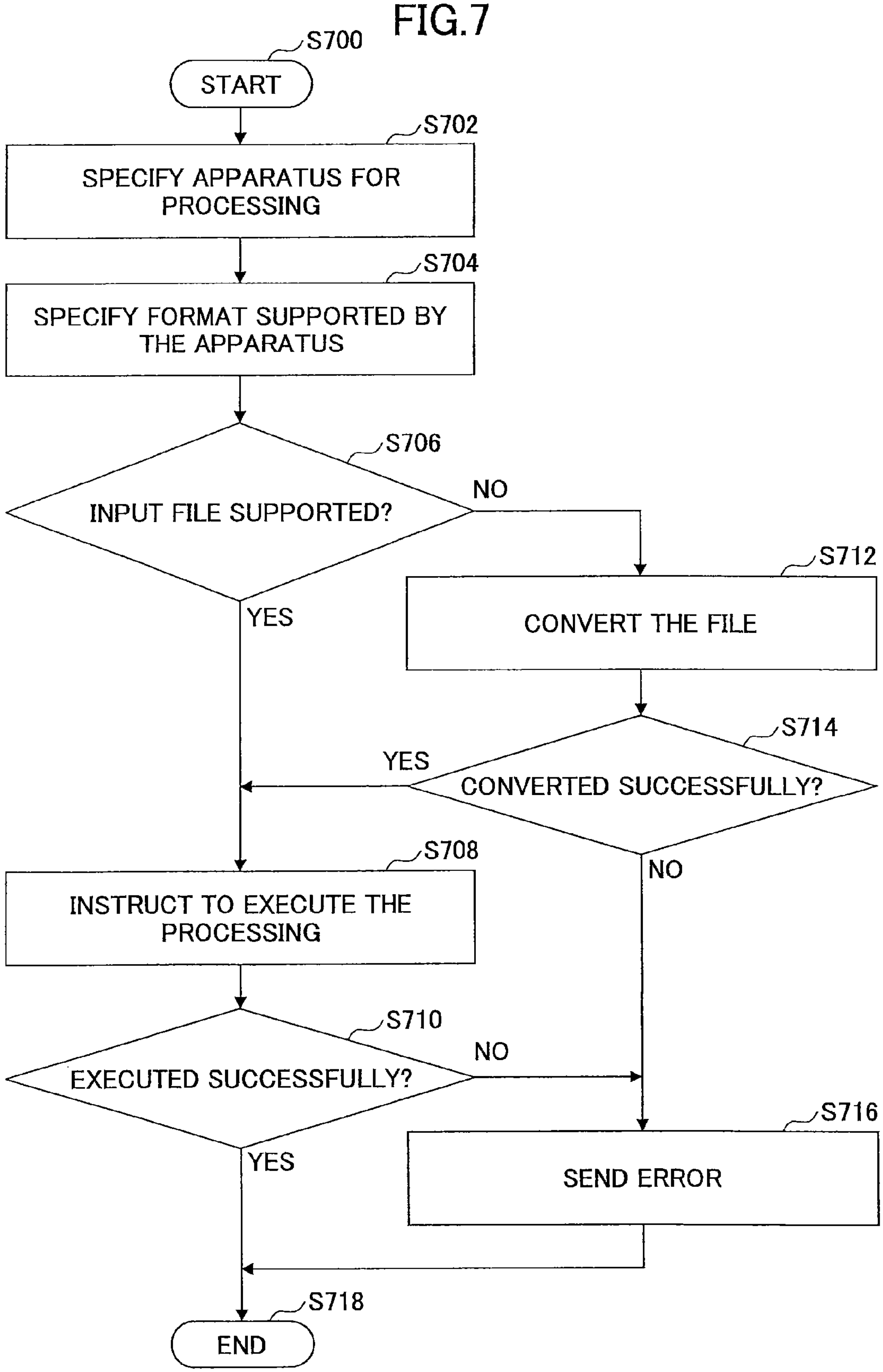
FIG. 7 is a flowchart illustrating a process performed by an execution instructing unit of an information providing device according to an embodiment of this invention.

A flowchart in FIG. 7 shows a flow of the above process performed by the execution instructing unit 544 (details are described below).

Figure 8:
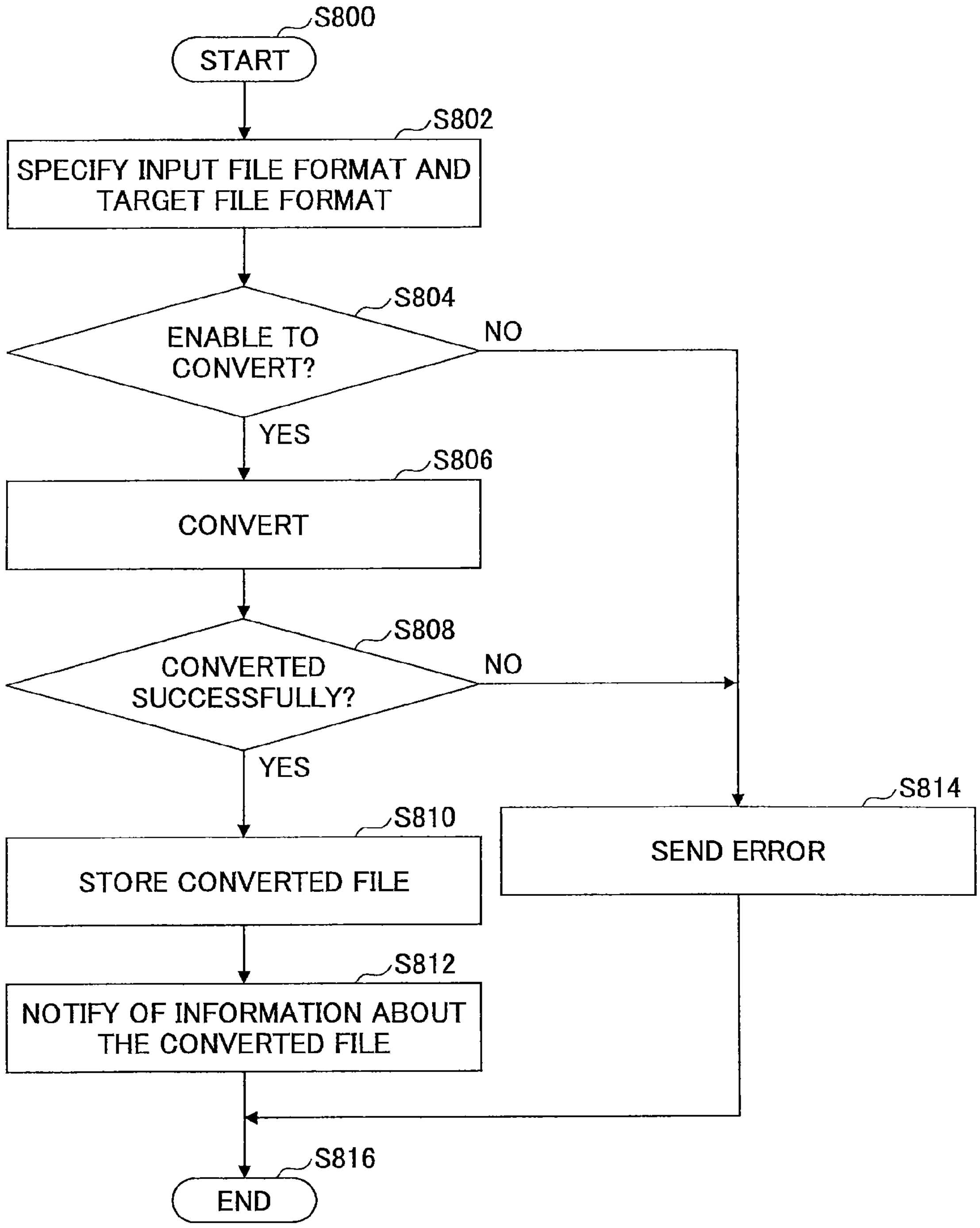
FIG. 8 is a flowchart illustrating a process performed by a conversion unit of an information providing device according to an embodiment of this invention.

The conversion unit 546 converts a file in a certain format specified by the execution instructing unit 544 into a file with a predefined format. The conversion unit 546 converts the input file specified by the execution instructing unit 544 into the file with the format specified by the execution instructing unit 544. The converted file is stored in the converted data storage unit 548 described later. The conversion unit 546 transfers the information about the converted file (e.g. the file itself or the path to the file) to the execution instructing unit 544. A flowchart showing a flow of the process performed by the conversion unit 546 is shown in FIG. 8 (details are described later). When the conversion of the file format fails or the format is not supported, the conversion unit 546 sends an error notification to the instructing unit 544.

The converted data storage unit 548 stores the file converted by the conversion unit 546. The converted data storage unit 548 may be implemented on not the information providing device 100 but an external server.

The apparatus 140 further includes a process execution unit 550.

The process execution unit 550 receives an instruction from the information providing device 100, and executes processing specified by the instruction. Types of the processing executed by the process execution unit 550 depend on the type of the apparatus 140. For example, when the apparatus works as the printer 140, the process execution unit 550 may execute processing to print a specified file. When the apparatus works as the projector 142, the process execution unit 550 may execute processing to display (project) a specified file. When the apparatus works as the MFP 144, the process execution unit 550 may execute processing to print or store on the storage device of the apparatus a specified file. The processing is not limited to the above examples. Here, in order to simplify the explanation, only the processing for printing, display and storage are used. When the processing finishes unsuccessfully, the process execution unit 550 sends an error notification to the information providing device 100.

With the above stated function, the information processing terminal 120 may be shown a list of the apparatuses which are in the same region with the information processing terminal 120. The user of the information processing terminal 120 may specify the apparatus, a file, and processing to cause the apparatus to execute the processing for the file. As a result, the workload of the user of the information processing terminal 120 may be reduced for connection configuration or driver installation to the apparatus which is in the same region.

(4. Process Flow)

With reference to FIGS. 6-11, the process of the system including the information providing device 100 according to an embodiment of this invention is explained. The following explanation is based on the configuration shown in FIG. 1.

(4.1 Obtaining Position Data)

Figure 10:
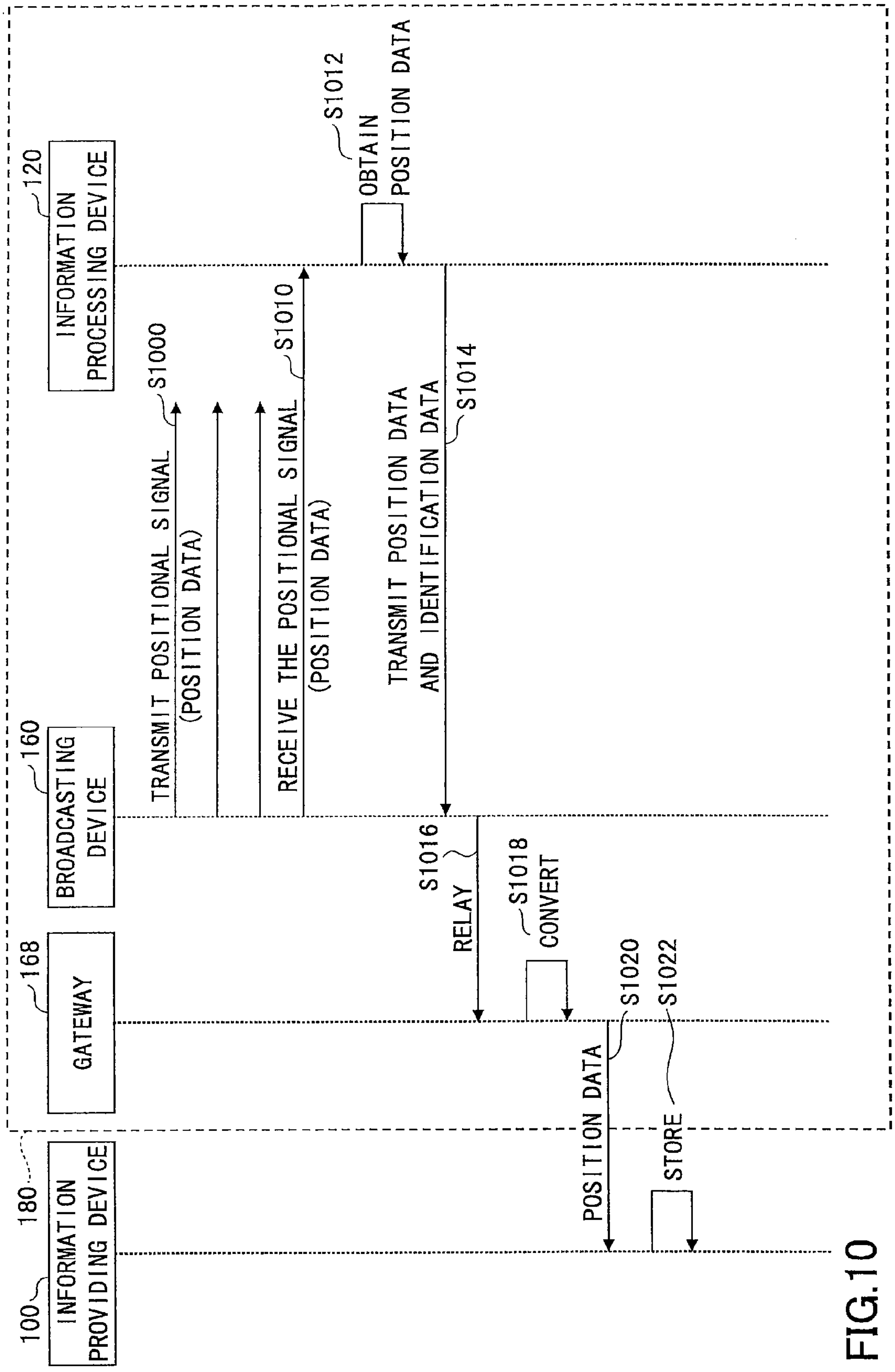
FIG. 10 is a sequence chart illustrating an exemplary process to obtain positional information performed by an information providing system according to an embodiment of this invention.

With reference to FIG. 10, the process in which the information providing device 100 obtains the position data of the information processing terminal 120 and the apparatuses 140-144 via the network 180 is explained. The following explanation is made with an example showing the process to obtain the position data of the information processing terminal 120. The broadcasting device 160 stores the following position data as shown in the broadcasting device data storage table in FIG. 12.

Latitude “35.459400”, Longitude “139.387100”, Floor “16”, Building “C”

In Step S1000, the position data transmission unit 500 of the broadcasting device 160 transmits the positioning signal including the position data to a predetermined area.

In Step S1010, the position data receiving unit 510*a* of the information processing terminal 120 receives the positioning signal transmitted by the position data transmission unit 500.

In Step S1012, the position data receiving unit 510*a* of the information processing terminal 120 obtains the position data from the received positioning signal. The position data may be stored at the predetermined position in a frame forming the positioning signal defined according to IMES standard. In this example, the information processing terminal 120 obtains the following position data.

Latitude “35.459400”, Longitude “139.387100”, Floor “16”, Building “C”

In Step S1014, the identification data transmission unit 514*a* of the information processing terminal 120 transmits to the broadcasting device 160 the identification data stored in the identification data storage unit 512*a* as well as the obtained positional data. Here, the identification data (MAC address) of the information processing terminal 120 is expressed as follows.

“012345abcd01”

In Step S1016, the relaying unit 502 of the broadcasting device 160 relays the positional data and the identification data received from the information processing terminal 120 to the gateway 168.

In Step S1018, the gateway 168 converts the data received from the network 180 to which the broadcasting device 160 is connected so that the data is suitable for the network 182 such as a LAN.

In Step S1020, the position data obtaining unit 520 of the information providing device 100 receives the position data and the identification data of the information processing terminal 120 via the broadcasting device 140 and the gateway 168.

In Step S1022, the position data storage unit 522 of the information providing device 100 stores the received position data of the information processing terminal 120. FIG. 13A shows the position data management table storing the position data of the information processing terminal 120. The above process is performed for the apparatuses 140-144 similarly. The stored position data of the apparatuses is shown in FIGS. 13B-13D.

With the above process, the information providing device 100 according to this embodiment may obtain the position data of the information processing terminal 120 carried by the user and the apparatuses 140-144.

(4.2 Executing Process on Apparatus)

With reference to FIGS. 6-9, the process is explained which is performed by the transmitted data determining unit 530, the execution instructing unit 544, the conversion unit 546, and the process execution unit 550 of the information providing device 100 according to an embodiment of the invention.

FIG. 6 shows a flowchart indicating the process performed by the transmitted data determining unit 530 of the information providing device 100 according to an embodiment of this invention.

In Step S600, the process starts.

In Step S602, the transmitted data determining unit 530 reads the region data stored in the region data storage unit 528 (FIG. 15).

In Step S604, the transmitted data determining unit 530 reads the position data of the information processing terminal 120 stored in the position data storage unit 522 (FIG. 13A).

In Step S606, the transmitted data determining unit 530 specified the region where the information processing terminal 120 is using the region data read in Step S602. The position data of the information processing terminal 120 in the example explained with FIG. 10 is as expressed as follows.

Latitude "35.459400", Longitude "139.387100", Floor "16", Building "C" Thus, the transmitted data determining unit 530 determines that the region where the information processing terminal 120 exists is "C16-S Side" shown in the region data table (FIG. 15).

In Step S608, the transmitted data determining unit 530 reads the position data of the apparatuses 140-144 stored in the position data storage unit 522 (FIGS. 13B-13D).

In Step S610, the transmitted data determining unit 530 specifies the apparatuses which are in the region specified in Step S606 using the region data read in Step S602 and the position data of the apparatuses read in Step S608. Here, based on the position data shown in FIGS. 13B-13D, the transmitted data determining unit 530 specifies all apparatuses 140-144 which are in the region "C16-S Side".

In Step S612, it is determined whether one or more apparatuses exist in the region where the information processing terminal 120 is. When one ore more exist, the process goes to Step S614. Otherwise, the process goes to Step S618.

In Step S614, the transmitted data determining unit 530 obtains the apparatus data of the apparatuses specified in Step S610 from the apparatus data storage unit 526. In this example, the apparatus data of the apparatuses 140-144 is obtained from the table shown in FIG. 14.

In Step S616, the transmitted data determining unit 530 specifies all or a subset of the apparatus data and the position data of the obtained apparatuses 140-144 as the information to be transmitted to the information processing terminal 120. FIG. 16 shows the table storing the obtained apparatus data and position data temporarily. In this example, the transmitted data determining unit 530 transmits all of the data to the information processing terminal 120 by the predetermined format via the network.

In Step S618, the transmitted data determining unit 530 determines that there is no information to be transmitted, and conveys information indicating that to the information transmission unit 532.

In Step S620, the process ends.

FIG. 7 shows a flowchart of the process performed by the execution instructing unit 544 of the information providing device 100 according to an embodiment of the invention.

In Step S700, the process starts.

In Step S702, the execution instructing unit 544 specifies the apparatuses using the information received from the information processing terminal 120 via the process request receiving unit 542. In this example, the following instruction is done by the user as shown in FIGS. 17, 18.

input file information "192.168.1.10/user1/doc/picture.jp2"

the identification data of the apparatus which performs processing: "002000abcd03"

processing information indicating the processing "PRINTING"

Here, the apparatus for the processing has the identification data "002000abcd03" (the apparatus name is "MFP3000").

In Step S704, the execution instructing unit 544 specifies the file format supported by the apparatus specified in Step S702. The supported file format may be specified with the apparatus data (FIG. 16) obtained in advance. In this example, the apparatus which may be specified with the identification data "002000abcd03" supports doc, pdf, jpeg and gif formats.

In Step S706, it is determined whether the format of the input file is supported by the specified apparatus. When the format is supported, the process goes to Step S708. Otherwise, the process goes to Step S712.

In Step S708, the execution instructing unit 544 instructs the specified apparatus to execute the specified processing using the specified file as input. Here, the execution instructing unit 544 transmits a command to cause the apparatus 140 ("MFP3000") to print the file.

In Step S710, it is determined whether the processing in Step S708 is executed successfully. If the process is executed successfully (S710, YES), the process goes to Step S718, and ends. Otherwise, the process goes to Step S716.

In Step S712, the execution instructing unit 544 causes the conversion unit 546 to convert the input file format. For that purpose, the execution instructing unit 544 transfers the input file and the target file format to the conversion unit 546. In this example, the execution instructing unit 544 transfers the following information to the conversion unit 546.

input file information "192.168.1.10/user1/doc/picture.jp2"

a target file format: "JPEG"

In Step S714, it is determined whether the conversion unit 546 converts the file successfully. If the conversion unit 546 converts the file successfully, the process goes to S708, and the processing is executed with the converted file. Otherwise, the process goes to Step S716.

In Step S716, the execution instructing unit 544 sends an error notification to the information processing terminal 120.

FIG. 8 shows a flowchart of the process performed by the conversion unit 546 of the information providing device 100 according to an embodiment of the invention.

In Step S800, the process starts.

In Step S802, the conversion unit 546 specifies the input file format and the target file format using the information specified by the execution instructing unit 544. In this example, the input file specified by the execution instructing unit 544 is "picture.jp2". Thus, the conversion unit 546 specifies the following formats.

Input file format: JPEG2000

Target file format: JPEG

The conversion unit 546 may use any methods to specify the input file format using the input file itself. For example, the conversion unit 546 may examine the internal data structure of the input file to specify the file format.

In Step S804, it is determined whether the conversion unit 546 is capable of converting the file from the input file format to the target file format. When the conversion unit 546 converts the file successfully, the process goes to Step S806. Otherwise, the process goes to Step S814.

In Step S806, the conversion unit 546 converts the format of the input file into the target file format. Here, JPEG2000 format input file "picture.jp2" is converted into JPEG format file "picture.jpg".

In Step S808, it is determined whether the conversion is successfully done. When the conversion is successfully done, the process goes to Step S810. Otherwise, the process goes to Step S814.

In Step S810, the conversion unit 546 stores the converted file in the converted data storage unit 548.

In Step S812, the conversion unit 546 notifies the execution instructing unit 544 of the information about the converted file. Here, the conversion unit 546 includes the path to the local directory (in the information providing device 100) in which the converted file is stored (e.g. "/home/user/tmp/picture.jpg").

In Step S814, the conversion unit 546 sends an error notification to the execution instructing unit 544.

In Step S816, the process ends.

Figure 9:
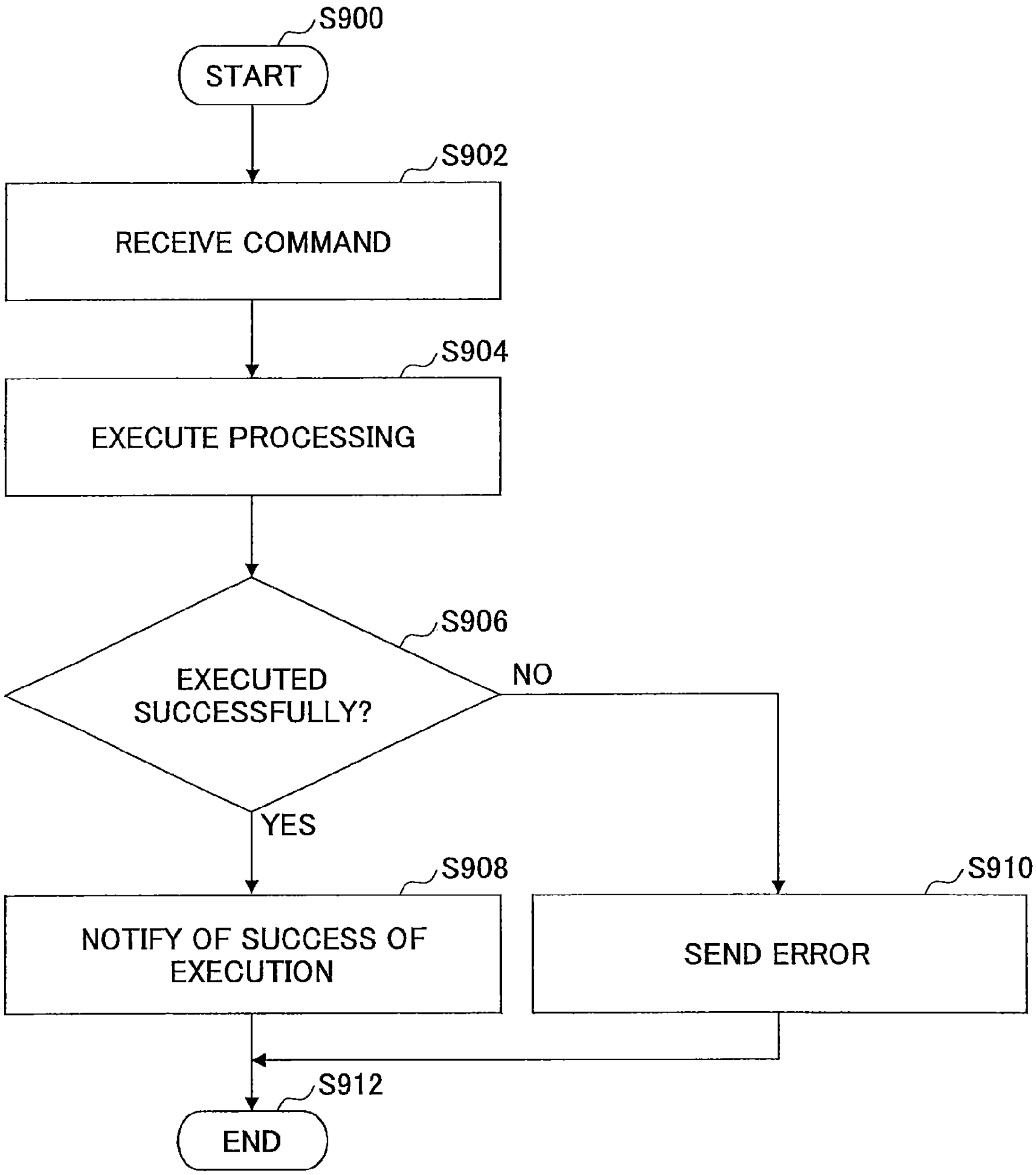
FIG. 9 is a flowchart illustrating a process performed by a process execution unit of an apparatus according to an embodiment of this invention.

FIG. 9 shows a flowchart of the process performed by the process execution unit 550 of the apparatus 140 according to an embodiment of this invention.

In Step S900, the process starts.

In Step S902, the process execution unit 550 receives the instruction transmitted by the execution instructing unit 544 of the information providing device 100. For example, the process execution unit 550 receives the instruction (command) to print the input file "/home/usr/tmp/picture.jpg".

In Step S904, the process execution unit 550 executes the instruction.

In Step S906, it is determined whether the process execution unit 550 successfully executes the processing. When the process execution unit 550 successfully executes the processing, the process goes to Step S908. Otherwise, the process goes to Step S910.

In Step S908, the process execution unit 550 notifies the execution instructing unit 544 of the information providing device of information indicating the processing is executed successfully.

In Step S910, the process execution unit 550 sends an error notification to the execution instructing unit 544 of the information providing device 100.

Figure 11:
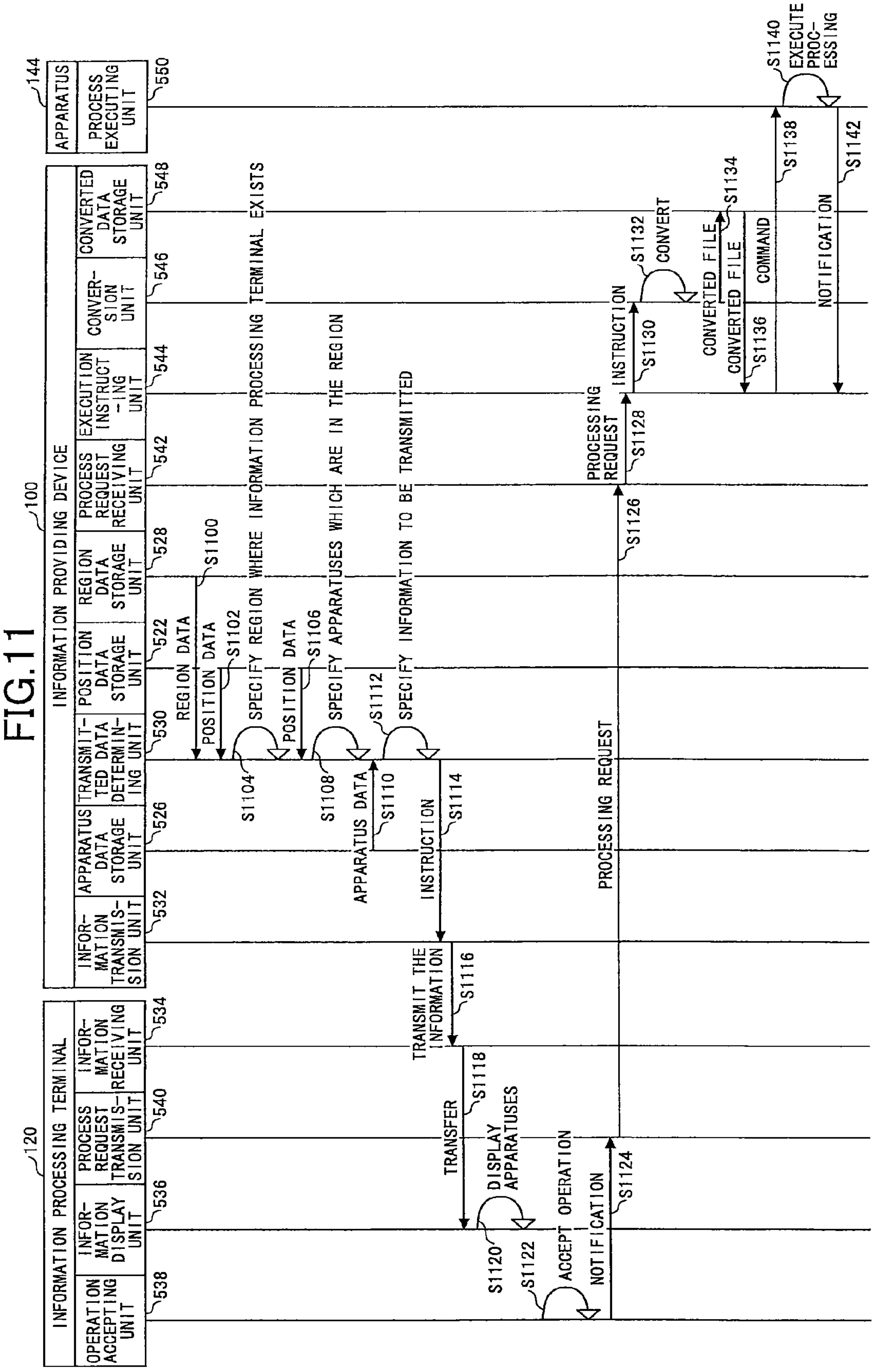
FIG. 11 is a sequence chart illustrating an exemplary process performed by an information providing system according to an embodiment of this invention.

With reference to FIG. 11, the process performed by the information providing device 100, the information processing terminal 120 and the apparatus 144 is explained. Here, the example in which the user instructs the apparatus 144 to print a JPEG2000 format image file is used. In addition, the information providing device 100 has already obtained and stored (FIGS. 13A-13D) the position data from the information processing terminal 120 and the apparatuses 140-144 according to the process shown in FIG. 10.

In Step S1100, the transmitted data determining unit 530 of the information providing device 100 reads the region data stored in the region data storage unit 528 (FIG. 15).

In Step S1102, the transmitted data determining unit 530 of the information providing device 100 reads the position data of the information processing terminal 120 stored in the position data storage unit 522 (FIG. 13A).

In Step S1104, the transmitted data determining unit 530 of the information providing device 100 specifies a region where the information processing terminal 120 exists using the region data read in Step S1102 and the position data of the information processing terminal 120 read in Step S1104 (FIG. 13A). Here, the position data of the information processing terminal 120 is expressed below.

Latitude "35.459400", Longitude "139.387100", Floor "16", Building "C" Thus, the transmitted data determining unit 530 specifies "C16-S Side" as the region where the information processing terminal 120 exists.

In Step S1106, the transmitted data determining unit 530 of the information providing device 100 reads the position data of the apparatuses 140-144 stored in the position data storage unit 522 (FIGS. 13B-13D).

In Step S1108, the transmitted data determining unit 530 of the information providing device 100 specifies, using the region data read in Step S1100 and the position data read in Step S1106, the apparatuses which are in the region specified in Step S1104. Here, the transmitted data determining unit 530 specifies all apparatuses 140-144 which are in "C16-S Side" from the position data of the apparatuses 140-144 (FIGS. 13B-13D).

In Step S1110, the transmitted data determining unit 530 of the information providing device 100 obtains the apparatus data of the apparatuses 140-144 specified in Step S1108 from the apparatus data storage unit 526.

In Step S1112, the transmitted data determining unit 530 of the information providing device 100 specifies the apparatus data and the position data of the apparatuses specified in Step S1108 as the information to be transmitted to the information processing terminal 120. FIG. 16 shows the information to be transmitted.

In Step S1114, the transmitted data determining unit 530 of the information providing device 100 instructs the information transmission unit 532 to transmit the information specified in Step S1112 to the information processing terminal 120.

In Step S1116, the information transmission unit 532 of the information providing device 100 transmits the information specified as the information to be transmitted in Step S1112 to the information processing terminal 120.

In Step S1118, the information receiving unit 534 of the information processing terminal 120 transfers the received information to the information display unit 536.

In Step S1120, the information display unit 536 of the information processing terminal 120 displays icons of the apparatuses using the received information. FIG. 17 shows an example of the screen where the information processing terminal 120 is a smart phone. In FIG. 17, the icons indicating "PRT1000" (corresponding to the apparatus 140), "PRJ2000" (corresponding to the apparatus 142), and "MFP3000" (corresponding to the apparatus 144) are displayed on the map. The names of the apparatuses correspond to "APPARATUS NAME" included in the information about the apparatus received by the information receiving unit 534. The positions of the icons on the map are determined based on "LATITUDE", "LONGITUDE", "FLOOR", and "BUILDING" included in the information about the apparatuses received by the information receiving unit 534. The map data may be stored in the information processing terminal 120 in advance, or may be obtained from an external server.

In Step S1122, the operation accepting unit 538 of the information processing terminal 120 accepts an input operation from the user as shown in FIG. 18. Here, the operation accepting unit 538 accepts the input operation which is intended to cause "MFP3000" (the identification data "002000abcd03") to "PRINT" the file "192.168.1.10/user1/doc/picture.jp2".

In Step S1124, the operation accepting unit 538 of the information processing terminal 120 notifies the process request transmission unit 540 of the information about the input operation.

In Step S1126, the process request transmission unit 540 of the information processing terminal 120 transmits the following information received from the operation accepting unit 538 to the information providing device 100.

input file information "192.168.1.10/user1/doc/picture.jp2";

the identification data of the apparatus which performs processing: "002000abcd03"; and processing information indicating the processing: "PRINTING".

In Step S1128, the process request receiving unit 542 of the information providing device 100 transfers the information received in Step S1126 to the execution instructing unit 544.

In Step S1130, the execution instructing unit 544 of the information providing device 100 instructs the conversion unit 546 to convert the format of the input file "JPEG2000" into the target file format "JPEG" since the specified apparatus ("002000abcd03") does not support the "JPEG2000" format.

In Step S1132, the conversion unit 546 of the information providing device 100 converts the format of "192.168.1.10/user1/doc/picture.jp2" (JPEG2000) into the general "JPEG" format.

In Step S1134, the conversion unit 546 of the information providing device 100 stores the converted file "/home/user/tmp/picture.jpg" in the converted data storage unit 548.

In Step S1136, the execution instructing unit 544 of the information providing device 100 obtains the converted file "/home/user/tmp/picture.jpg" stored in the converted data storage unit 548.

In Step S1138, the execution instructing unit 544 of the information providing device 100 transmits to the specified apparatus 144 ("002000abcd03") a command to cause the apparatus to print the converted file "/home/user/tmp/picture.jpg". Here, the identification data of the apparatus and connection information about the apparatus (e.g. an IP address) have been associated with a configuration file in advance.

In Step S1140, the process execution unit 550 of the apparatus 144 executes the printing for the file "/home/usr/tmp/picture.jpg" according to the received command.

In Step S1142, the process execution unit 550 of the apparatus 144 transmits to the information providing device 100 a notification that the printing has finished successfully.

With the above stated process, the user may use, via the information processing terminal 120, the apparatuses 140-144 located near the user without connection configuration or driver installation.

In the above example, the apparatus 144 (MFP) executes the printing process. However, the apparatus 144 may execute the storing process (copying the file to the storage device of the apparatus 144) based on the above process. In this case, the command transmitted to the apparatus 144 may be different. In addition, the apparatus 142 (projector) may execute a displaying process in common with the above process. The command issued by the execution instructing unit 544 of the information providing device 100 may vary depending on the executed processing or the apparatus.

In the above example, the position data is obtained from the positioning signal transmitted from the broadcasting devices 160-166. However, in this invention, the position data may be obtained in any other manner. For example, when the information processing terminal 120 and the apparatuses 140-144 are connected to a wireless LAN, the position data may be obtained by information about an access point of the wireless network. In this case, the broadcasting devices 160-166 and the gateway 168 which form the network 180 may be unnecessary, and it eliminates the need for the positioning devices 308, 410 of the information processing terminal 120 and the apparatus 140, respectively. As a result, the network configuration may be simplified.

In the above example, the information providing device 100 is implemented on a single device as shown in FIG. 5. However, this invention is not limited to the example, and some parts of the functions of the information providing device 100 may be deployed on several devices. For example, two devices may be provided separately—a position data management device for receiving and managing the identification data and the position data of the apparatuses 140-144 and the information processing terminal 120; and an apparatus data transmission device for obtaining and transmitting the data of the apparatuses which are in the same region with the information processing terminal 120. The position data management device may include the position data obtaining unit 520 of the information providing device 100 shown in FIG. 5, and may store the identification data and the position data which are obtained. The apparatus data transmission device may include any units except the position data obtaining unit 520 of the information providing device 100, and may obtain the identification data and the position data of the apparatus and the information processing terminal from the position data management device. In this way, the load incurred on a single device may be distributed.

(5. Variants)

In the above stated example, when the input file format is not supported by the specified apparatus, the conversion unit 546 of the information providing device 100 converts the input file. However, in this variant, a conversion unit 546*a* is implemented in an information processing terminal 120A and converts the file on the information processing terminal 120A. In the following example, the information processing terminal 120A converts the input file format.

(Functions)

Figure 23:
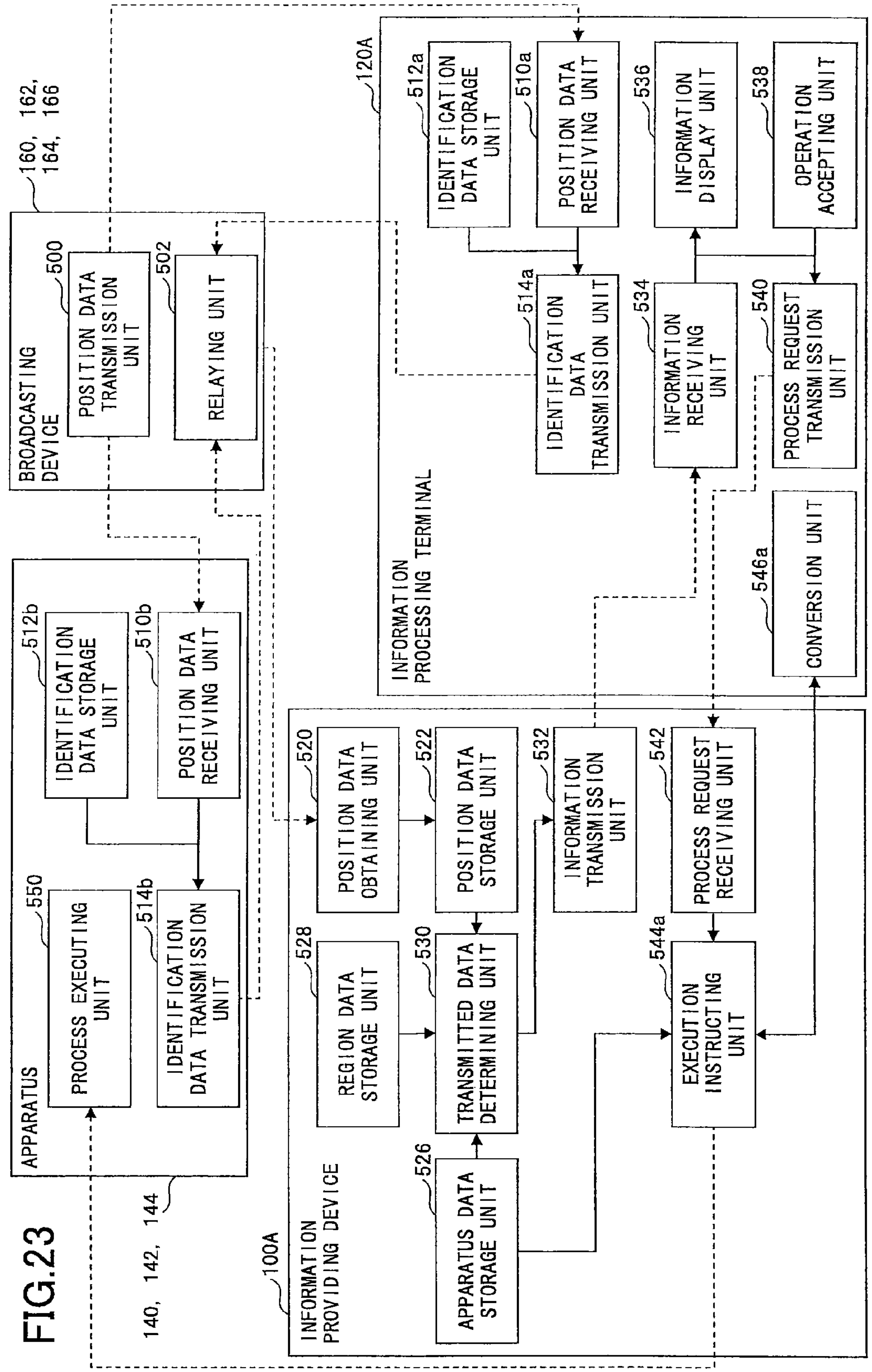
FIG. 23 is a block diagram illustrating exemplary functional configurations of an information providing device, an apparatus, and a broadcasting device according to an embodiment of this invention.

FIG. 23 shows the function block of the information providing system in which the information processing terminal 120A has the conversion function. Unlike the function block shown in FIG. 5, an information providing device 100A shown in FIG. 23 does not include the conversion unit and the converted data storage unit, but the information processing terminal 120A includes the conversion unit 546*a*.

An execution instructing unit 544*a* of the information providing device 100A in this example, when the input file format is not supported by the apparatus for processing, instructs the conversion unit 546*a* of the information processing terminal 120A to convert the input file format. To this end, the execution instructing unit 544*a* transfers the input file and the target file format to the conversion unit 546*a*.

The conversion unit 546*a* of the information processing terminal 120A in this example converts the format of the input file transferred from the execution instructing unit 544*a* into the target file format similarly transferred from the execution instructing unit 544*a*. The conversion unit 546*a* transfers the converted file to the execution instructing unit 544*a* of the information providing device 100A.

Such configuration results in a reduction of load on the information providing device 100A.

(Process Performed by Execution Instructing Unit)

Figure 24:
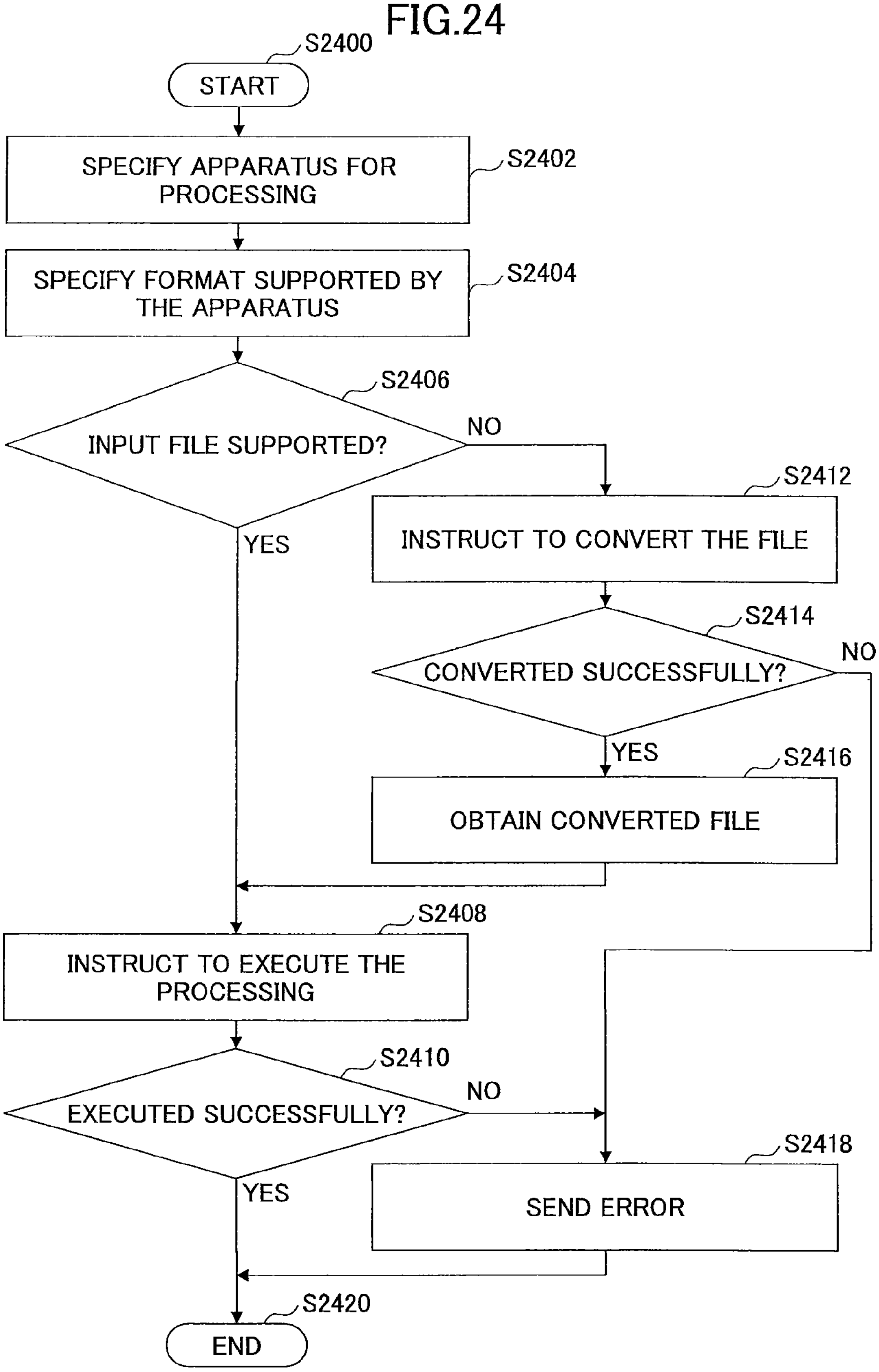
FIG. 24 is a flowchart illustrating a process performed by an information providing device according to an embodiment of this invention.

With reference to FIG. 24, a flowchart of the process performed by the execution instructing unit 544*a* of the information providing device 100A in this example is explained.

In Step S2400, the process starts.

In Step S2402, the execution instructing unit 544*a* specifies the apparatuses using the information received from the information processing terminal 120A via the process request receiving unit 542. In this example, the following instruction is done by the user as shown in FIGS. 17, 18.

- input file information "192.168.1.10/user1/doc/picture.jp2"
- the identification data of the apparatus which performs processing: "002000abcd03"
- processing information indicating the processing "PRINTING"

Here, the apparatus for the processing has the identification data "002000abcd03" (the apparatus name is "MFP3000").

In Step S2404, the execution instructing unit 544*a* specifies the file format supported by the apparatus specified in Step S2402. The supported file format may be specified with the apparatus data (FIG. 16) obtained in advance. In this example, the apparatus which may be specified with the identification data "002000abcd03" supports doc, pdf, jpeg and gif formats.

In Step S2406, it is determined whether the format of the input file is supported by the specified apparatus. When the format is supported, the process goes to Step S2408. Otherwise, the process goes to Step S2412.

In Step S2408, the execution instructing unit 544*a* instructs the specified apparatus to execute the specified processing using the specified file as input. Here, the execution instructing unit 544*a* transmits a command to cause the apparatus 140 ("MFP3000") to print the file.

In Step S2410, it is determined whether the processing in Step S2408 is executed successfully. If the process is executed successfully, the process goes to Step S2420, and ends. Otherwise, the process goes to Step S2418.

In Step S2412, the execution instructing unit 544*a* transfers the input file and the target file format to the conversion unit 546*a* of the information processing terminal 120A, and instructs the conversion unit 546*a* to convert the file. In this example, the execution instructing unit 544*a* transfers the following information to the conversion unit 546*a*.

input file information: "192.168.1.10/user1/doc/picture.jp2"

a target file format: "JPEG"

In Step S2414, it is determined whether the conversion. If the conversion unit 546*a* successfully finishes the conversion, the process goes to Step S2416, and the execution instructing unit 544*a* obtains the converted file. After that, the process goes to Step S2408, and the execution instructing unit 544*a* instructs the specified apparatus to execute the specified processing using the converted file as input. On the other hand, when the conversion unit 546*a* fails to finish the conversion in Step S2414, the process goes to Step S2418.

In Step S2418, the execution instructing unit 544*a* sends an error notification to the information processing terminal 120A.

(Process Performed by Conversion Unit)

Figure 25:
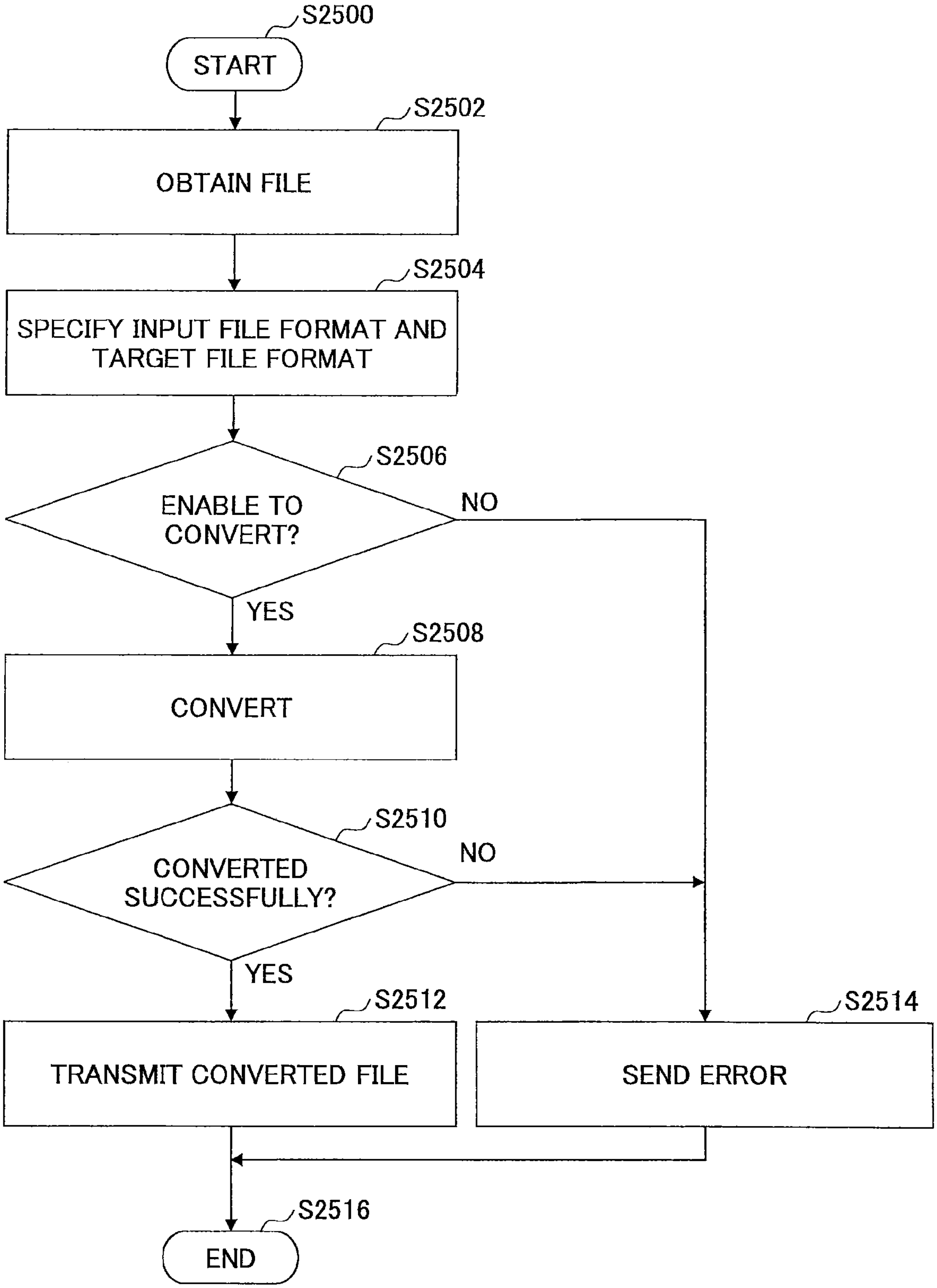
FIG. 25 is a flowchart illustrating a process performed by a conversion unit of an information processing terminal according to an embodiment of this invention.

FIG. 25 is a flowchart of the process performed by the conversion unit 546*a* of the information processing terminal 120A in this example.

In Step S2500, the process starts.

In Step S2502, the conversion unit 546*a* obtains the input file specified by the execution instructing unit 544*a* of the information providing device 100A. In this example, the conversion unit 546*a* obtains the input file "picture.jp2" specified by the execution instructing unit 544*a*.

In Step S2504, the conversion unit 546*a* specifies the input file format and the target file format specified by the execution instructing unit 544*a* of the information providing device 100A. In this example, the conversion unit 546*a* specifies the following formats.

Input file format: JPEG2000

Target file format: JPEG

The conversion unit 546*a* may use any methods to specify the input file format using the input file itself. For example, the conversion unit 546*a* may examine the internal data structure of the input file to specify the file format.

In Step S2506, it is determined whether the conversion unit 546*a* is capable of converting the file from the input file format to the target file format. When the conversion unit 546*a* converts the file successfully, the process goes to Step S2508. Otherwise, the process goes to Step S2514.

In Step S2508, the conversion unit 546*a* converts the format of the input file into the target file format. Here, JPEG2000 format input file "picture.jp2" is converted into JPEG format file "picture.jpg".

In Step S2510, it is determined whether the conversion is successfully done. When the conversion is successfully done, the process goes to Step S2512. Otherwise, the process goes to Step S2514.

In Step S2512, the conversion unit 546*a* transfers the converted file to the execution instructing unit 544*a* of the information providing device 100A.

In Step S2514, the conversion unit 546*a* sends an error notification to the execution instructing unit 544*a*.

In Step S2516, the process ends.

(Sequence of the Process)

Figure 26:
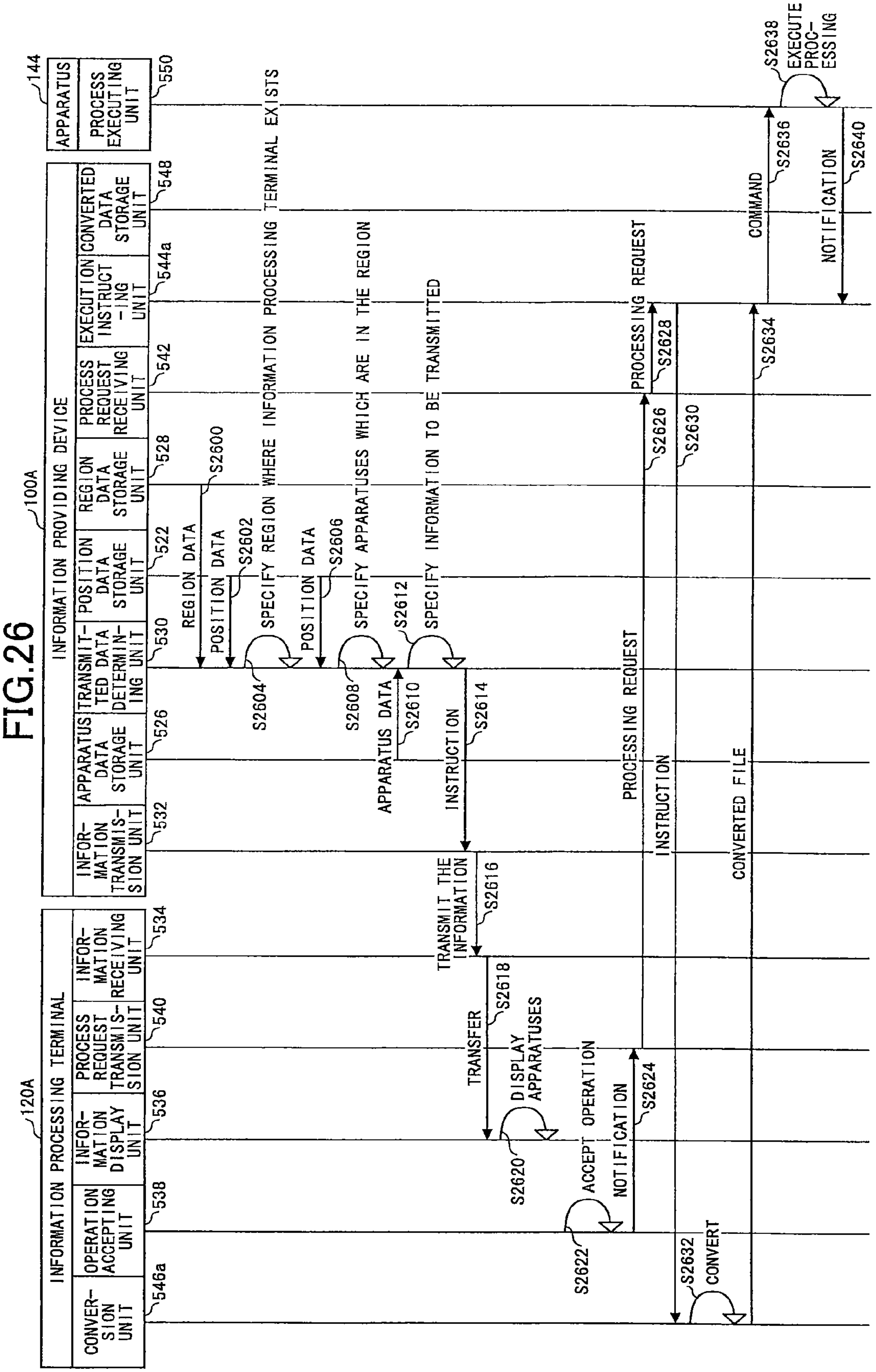
FIG. 26 is a sequence chart of a process performed by an information providing system according to an embodiment of this invention.

With reference to FIG. 26, the process of the information providing device 100A, the information processing terminal 120A and the apparatus 144 is explained. Here, the example in which the user instructs the apparatus 144 to print a JPEG2000 format image file is used in common with the case shown in FIG. 11. In addition, the information providing device 100A has already obtained and stored (FIGS. 13A-13D) the position data from the information processing terminal 120A and the apparatuses 140-144 according to the process shown in FIG. 10.

First, Steps S2600-S2628, in which the information providing device 100A specifies the apparatuses which are in the region where the information processing terminal 120A exists, transmits the apparatus data and the position data of the apparatuses to the information processing terminal 120A, and receives the processing request from the information processing terminal 120A, correspond to Steps S1100-S1128 shown in FIG. 11.

In Step S2630, the execution instructing unit 544*a* of the information providing device 100A instructs the conversion unit 546*a* of the information processing terminal 120A to convert the format of the input file "JPEG2000" into the target file format "JPEG" since the specified apparatus ("002000abcd03") does not support the "JPEG2000" format.

In Step S2632, the conversion unit 546*a* of the information processing terminal 120A converts the format of "192.168.1.10/user1/doc/picture.jp2" (JPEG2000) into the general "JPEG" format.

In Step S2634, the execution instructing unit 544*a* of the information providing device 100A obtains the converted file "/home/user/tmp/picture.jpg" from the conversion unit 546*a* of the information processing terminal 120A.

In Step S2636, the execution instructing unit 544*a* of the information providing device 100A transmits to the specified apparatus 144 ("002000abcd03") a command to cause the apparatus to print the converted file "/home/user/tmp/picture.jpg". Here, the identification data of the apparatus and connection information about the apparatus (e.g. an IP address) have been associated with a configuration file in advance.

In Step S2638, the process execution unit 550 of the apparatus 144 executes the printing for the file "/home/usr/tmp/picture.jpg" according to the received command.

In Step S2640, the process execution unit 550 of the apparatus 144 transmits to the information providing device 100A a notification that the printing has finished successfully.

With the above process, the information providing device in this example need not convert an input file. That is especially advantageous when the information providing device 100A has to accept processing requests from many information processing terminals and transmit commands to apparatuses.

CROSS-REFERENCE TO RELATED APPLICATIONS

The present application is based upon and claims the benefit of priority of Japanese Patent Application No. 2012-202095 filed on Sep. 13, 2012, and Japanese Patent Application No. 2013-182177 filed on Sep. 3, 2013, the entire contents of which are incorporated herein by reference.

[Patent Document]

[Patent Document 1] Japanese Laid-open Patent Publication No. 2009-225287

What is claimed is:

1. An information providing device, which is capable of communicating with an information processing terminal and one or more information processing apparatuses executing processing responding to a request from the information processing terminal, the information providing device comprising:

a position data obtaining unit configured to obtain position data of the information processing terminal and the information processing apparatuses;

a specifying unit configured to specify, based on the obtained position data of the information processing terminal, a region where the information processing terminal is, and specify, based on the obtained position data of the information processing apparatuses, one or more of the information processing apparatuses which are in the region; and an instruction unit configured to, responding to the request from the information processing terminal, instruct an information processing apparatus of the specified information processing apparatuses specified by the specifying unit and specified by the request to execute the processing also specified by the request, wherein the position data of the information processing terminal is obtained by the information processing terminal from a positioning signal transmitted by a broadcasting device installed in the region, and the position data of the information processing terminal is received from the information processing terminal via the broadcasting device.

2. The information providing device as claimed in claim 1, further comprising a data transmission unit configured to transmit to the information processing terminal information about the one or more of the information processing apparatuses specified by the specifying unit.

3. The information providing device as claimed in claim 2, wherein the information transmitted by the data transmission unit includes position data representing positions at which the information processing apparatuses are situated and apparatus data representing names of the information processing apparatuses and types of the processing executed by the information processing apparatuses.

4. The information providing device as claimed in claim 3, wherein the position data is used to display the positions of the information processing apparatuses on the information processing terminal.

5. The information providing device as claimed in claim 4, wherein the names of the information processing apparatuses and the types of the processing executed by the information processing apparatuses are displayed on the information processing terminal.

6. The information providing device as claimed in claim 1, wherein the request from the information processing terminal contains information about an input file used for the processing.

7. The information providing device as claimed in claim 6, further comprising a conversion unit configured to convert a format of the input file, wherein the conversion unit converts the format into a format supported by the one of the information processing apparatuses, and the instruction unit instructs the one of the information processing apparatuses to execute the processing using the input file converted by the conversion unit.

8. The information providing device as claimed in claim 6, wherein the instruction unit causes the information processing terminal to convert a format of the input file, and instructs the one of the information processing apparatuses to execute the processing using the converted input file.

9. The information providing device as claimed in claim 1, wherein the processing includes at least one of display processing, print processing, and storage processing.

10. An information providing method executed on an information providing device, which is capable of communicating with an information processing terminal and one or more information processing apparatuses executing processing responding to a request from the information processing terminal, the method comprising:

obtaining position data of the information processing terminal and the one or more of the information processing apparatuses;

specifying, based on the obtained position data of the information processing terminal, a region where the information processing terminal is, the position data of the information processing terminal being obtained by the information processing terminal from a positioning signal transmitted by a broadcasting device installed in the region, and the position data of the information processing terminal being received from the information processing terminal via the broadcasting device;

specifying, based on the obtained position data of the information processing apparatuses, one or more of the information processing apparatuses which are in the region; and responding to the request from the information processing terminal, instructing an information processing apparatus of the information processing apparatuses specified at the specifying step and specified by the request to execute the processing also specified by the request.

11. An information providing system comprising:

an information processing terminal; and an information providing device which is capable of communicating with one or more information processing apparatuses executing processing responding to a request from the information processing terminal, wherein the information providing device includes a position data obtaining unit configured to obtain position data of the information processing terminal and the one or more of the information processing apparatuses, a specifying unit configured to specify, based on the obtained position data of the information processing terminal, a region where the information processing terminal is, and specify, based on the obtained position data of the information processing apparatuses, one or more of the information processing apparatuses which are in the region, a data transmission unit configured to transmit to the information processing terminal information about the information processing apparatuses specified by the specifying unit, and an instruction unit configured to, responding to the request from the information processing terminal, instruct an information processing apparatus of the information processing apparatuses specified by the specifying unit and specified by the request to execute the processing also specified by the request, the information processing terminal includes an information display unit configured to display the information about the information processing apparatuses transmitted by the data transmission unit, an operation accepting unit configured to accept an operation to choose the processing to be executed by the information processing apparatus of the displayed information processing apparatuses, and a processing request unit configured to transmit to the information providing device the request for allowing the chosen information processing apparatus to execute the processing chosen by the operation, the position data of the information processing terminal is obtained by the information processing terminal from a positioning signal transmitted by a broadcasting device installed in the region, and the position data of the information processing terminal is received from the information processing terminal via the broadcasting device.

* * * * *